(12) United States Patent
Judd

(10) Patent No.: US 12,438,580 B1
(45) Date of Patent: Oct. 7, 2025

(54) FORWARD ERROR CORRECTION

(71) Applicant: Mano D. Judd, Heath, TX (US)

(72) Inventor: Mano D. Judd, Heath, TX (US)

(73) Assignee: Mano D. Judd, Heath, TX (US)

( * ) Notice: Subject to any disclaimer, the term of this patent is extended or adjusted under 35 U.S.C. 154(b) by 439 days.

(21) Appl. No.: 18/101,165

(22) Filed: Jan. 25, 2023

(51) Int. Cl.
*H04B 7/06* (2006.01)
(52) U.S. Cl.
CPC ................. *H04B 7/0617* (2013.01)
(58) Field of Classification Search
CPC .... H04B 7/0617; H04B 7/0667; H04B 17/12; H04B 17/364; H04B 17/102
See application file for complete search history.

(56) References Cited

U.S. PATENT DOCUMENTS

2022/0320729 A1* 10/2022 Cohen ..................... H01Q 3/34

* cited by examiner

*Primary Examiner* — Keith Ferguson

(57) ABSTRACT

The Forward Error Correction (FEC) technique completely estimates the total Far Field Transmit Radiation Path, time delays, as well as amplitude values and variations for the full path between the RF exciters and antennas, in an RF Phased Array System. These paths are normally unknown and therefore difficult to calibrate or estimate. The technique also corrects for phase and amplitude differences and variations in non-equal length RF cables, thus removing the requirement for phase matched cables in the array system.

10 Claims, 19 Drawing Sheets

FORWARD ERROR CORRECTION

BACKGROUND

In many RF Array Systems, especially ones with very large or dispersed arrays such as the low frequency arrays, phase matching of RF cables to assure RF coherency and beam steering ability is required. This is due to the requirement that each channel circuit path from each array antenna to its receiver or transceiver must be exactly equal. This therefore incurs substantial additive costs for the procurement or fabrication of phased matched cables or equal length corporate feeds to the multiplicity of array antennas. For an airborne system, required use of RF phased matched cables not only adds system cost, but generates much additional weight and volume for the collection of equal length cables. That is, while the distance from one antenna to the receiver or transceiver system may be short, its cable needs to be the same length as the cable used for the antenna furthest from the transceiver system.

Another problem is that unknown and/or unpredictable phase and/or amplitude changes or perturbations, due to temperature changes within active components and even passive devices and transmission lines (e.g. RF cables), can produce large errors in the system performance.

In most receive, and especially transmit systems, these perturbations and/or distortions are typically not addressed or compensated for.

BRIEF SUMMARY OF THE INVENTION

The Forward Error Correction (FEC) technique completely estimates the total far field transmit radiation path length, time delay, as well as amplitude value(s) for the full RF circuit path between the RF Exciter and the Antenna. These paths (lengths, or delay times) are firstly unknown, difficult to calibrate, and can change from product lot to lot as well as vary across temperature and time. Thus, while the FEC technique corrects for all phase and amplitude variations and changes in the system, it also corrects for phase and/or amplitude differences in non-equal length RF cables, removing any requirement for phased matched cables in the array system. This is a very powerful benefit.

DETAILED DESCRIPTION AND BEST MODE OF IMPLEMENTATION

Figure 1:
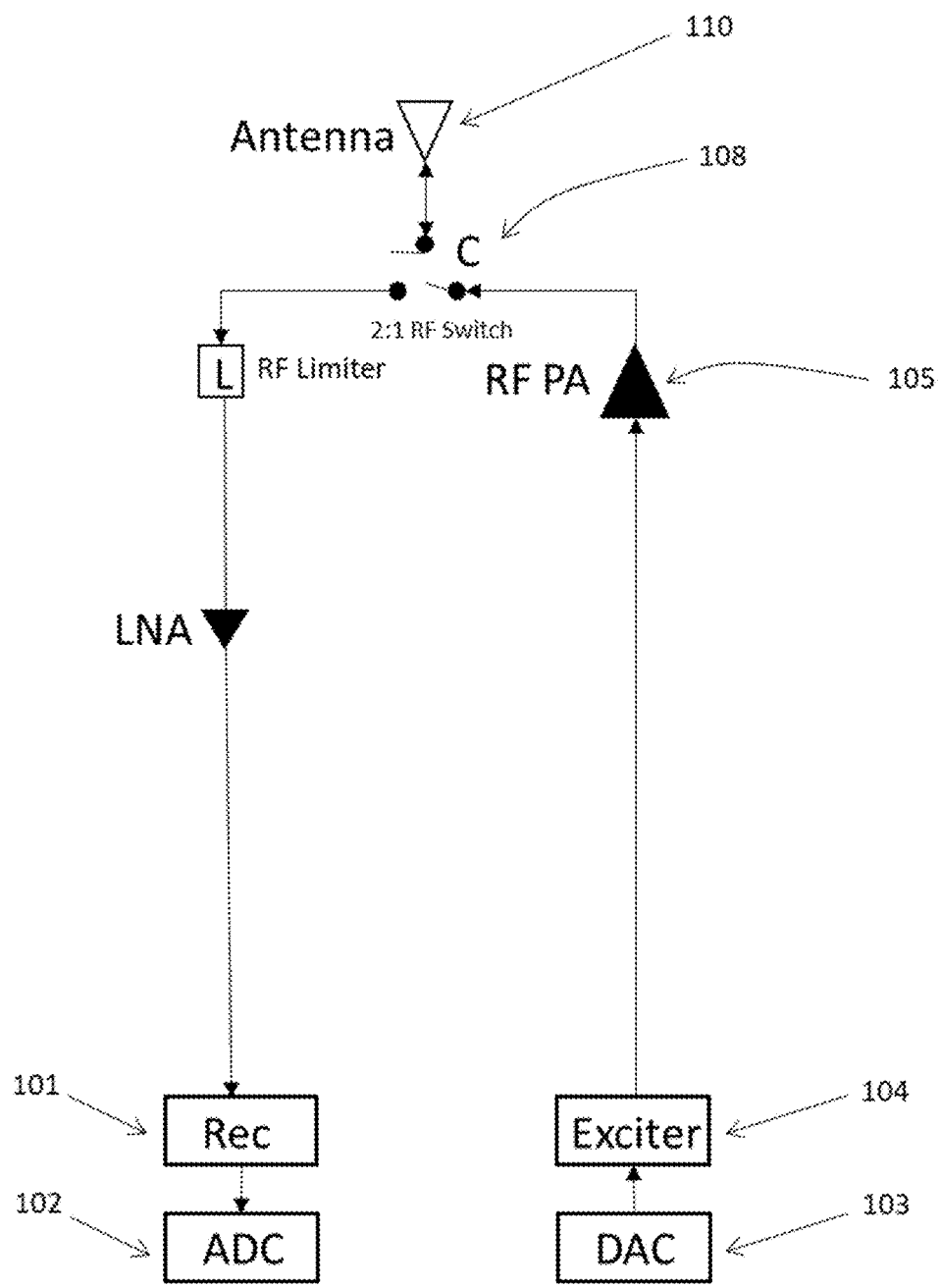
FIG. 1 shows the block diagram of a conventional Phased Array antenna channel.

FIG. 1 shows the block diagram of a conventional Phased Array channel, consisting of a transmitter (or transceiver) section, composed of a Digital to Analog Converter (DAC), (103), feeding the (Digital to RF) Exciter (104), and the RF Receiver (101) feeding the Analog to Digital Converter (ADC), (102). Towards the (channel) antenna is an RF Power Amplifier (RF PA), (105), connecting to a 2:1 RF Switch (108).

Figure 2:
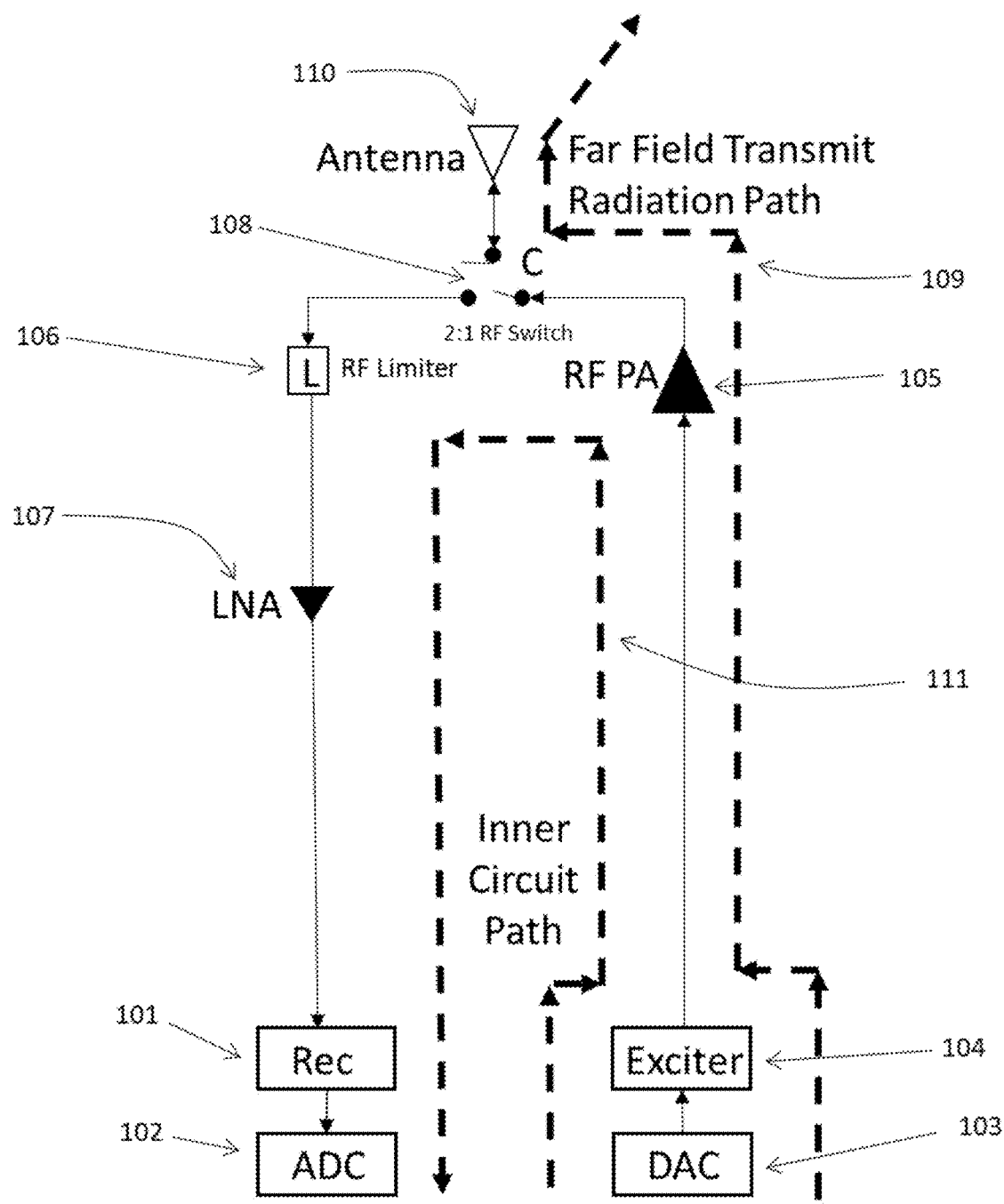
FIG. 2 shows the block diagram of a conventional Phased Array antenna channel, with two electrical paths: an inner circuit path and the desired Far Field Transmit Radiation Path.

FIG. 2 shows the same block diagram, however, with the Far Field Transmit Radiation Path (109) and an Inner Circuit Path (111) for the system. One side of the switch (108) connects the Antenna (110), to the RF PA (105), which is within the Far Field Transmit Radiation Path (109), and the other side of the switch connects the Antenna (110) to the Receiver (101). The Far Field Transmit Radiation Path (109) length is typically an unknown value, thus obtaining an estimate for its total length and phase (length) is the core of this novelty.

Figure 3:
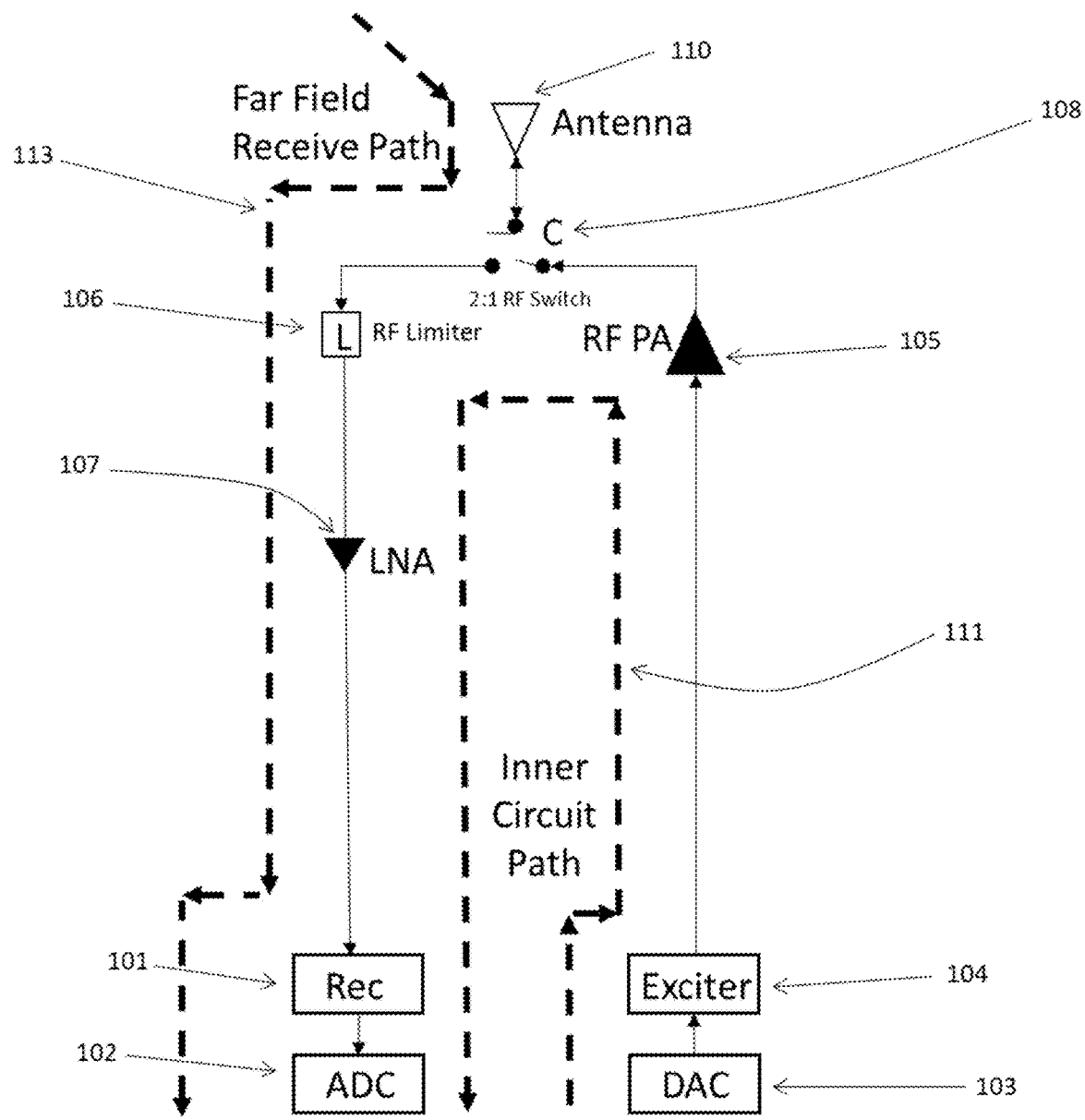
FIG. 3 shows the block diagram of a conventional Phased Array antenna channel, with two electrical paths: an inner circuit path and the Far Field Receive Path.

FIG. 3 shows the same block diagram, however with the Far Field Receive Path (113) and an Inner Circuit Path (111) for the system. Often in the Receive Path (113), following the antenna, is an RF Limiter (106), which limits the [often destructive] high power RF from damaging the following components, such as the Low Noise Amplifier (LNA), (107), or the RF Receiver (101), shown. Using the 2:1 RF Switch (108), at the Antenna, this system would only be half duplex, since it could not Transmit and Receive at the same time. However, this system allows greater isolation from the Transmit port (104) and PA (105) to the Receive port (101), adding extra RF power protection to the receive circuitry. While there are numerous variations of this circuit topology, in which additional components and circuits could be added, FIGS. (1) through (3) show the fundamental circuit topology that is used in most Switched based active array systems. Therefore any person skilled in the art would contend that different variations of this circuit, are still fundamentally the same as FIG. (1) through FIGS. (3).

Figure 4:
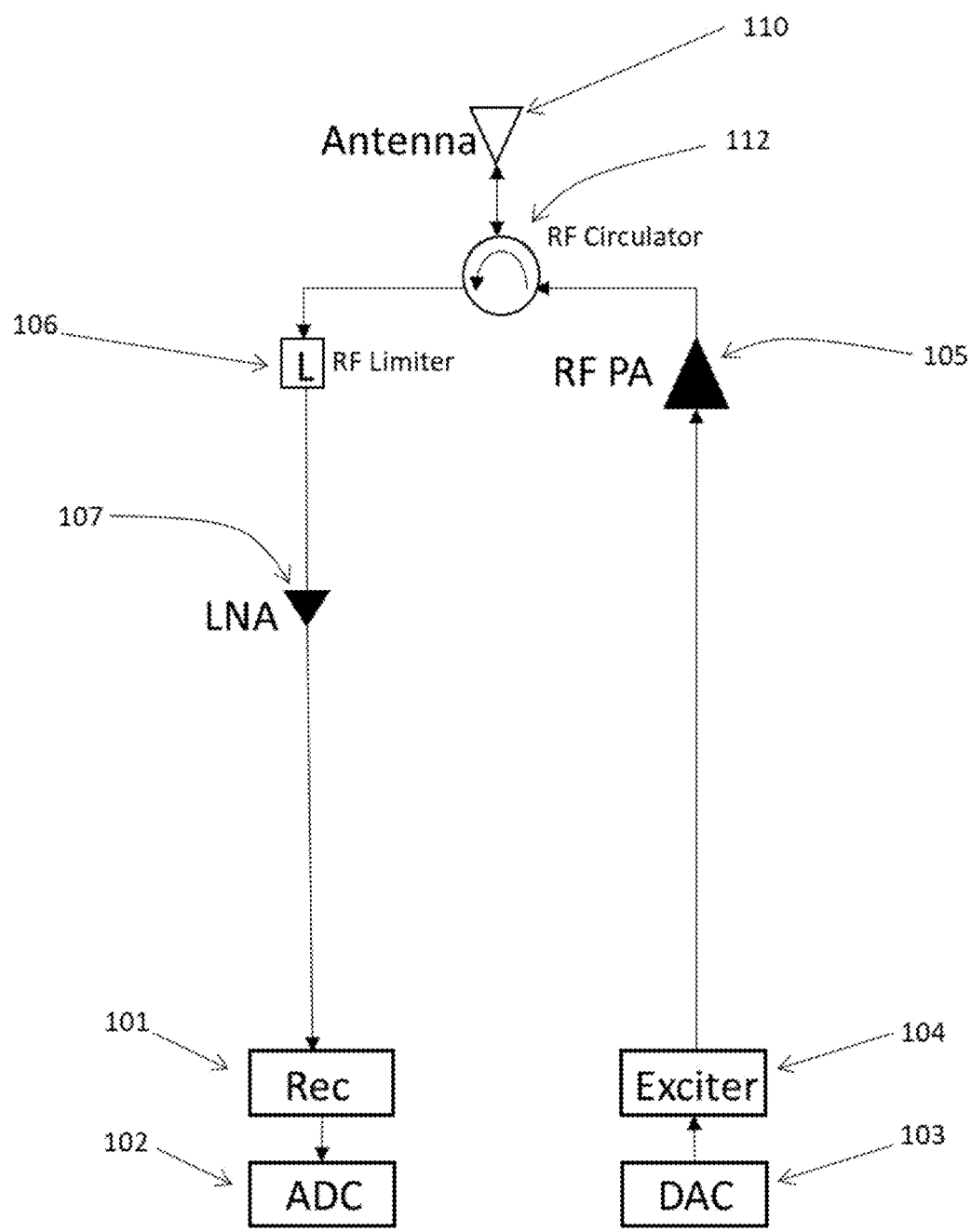
FIG. 4 shows a block diagram of a conventional Phased Array antenna channel, however, the RF 2:1 switch at the antenna has been replaced by an RF Circulator.

FIG. 4 shows a similar block diagram to FIG. 1, however, the 2:1 RF switch (108) at the antenna (100) has been replaced by an RF Circulator (112). The Circulator (112) enables full duplex; for the system to receive signals at the same time the transmission path is generating and transmitting signals. However, most Circulators are very band limited and only provide roughly 20 to 40 dB of isolation between the transmitter and receiver ports. For the sake of completeness, either switch (108) or circulator (112) can be used in all following designs, configurations, and embodiments. However, the remainder of this document will use the 2:1 RF Switch (108) configuration, since it lends greater applicability to wideband use, wideband systems, as well as very high power amplifier systems. While there are numerous variations of this circuit topology, in which additional components and circuits could be added, Figures (4) through (6) show the fundamental circuit topology that is used in most RF Circulator based active array systems. Therefore any person skilled in the art would contend that different variations of this circuit, are still fundamentally the same as Figures (4) through Figures (6).

Figure 5:
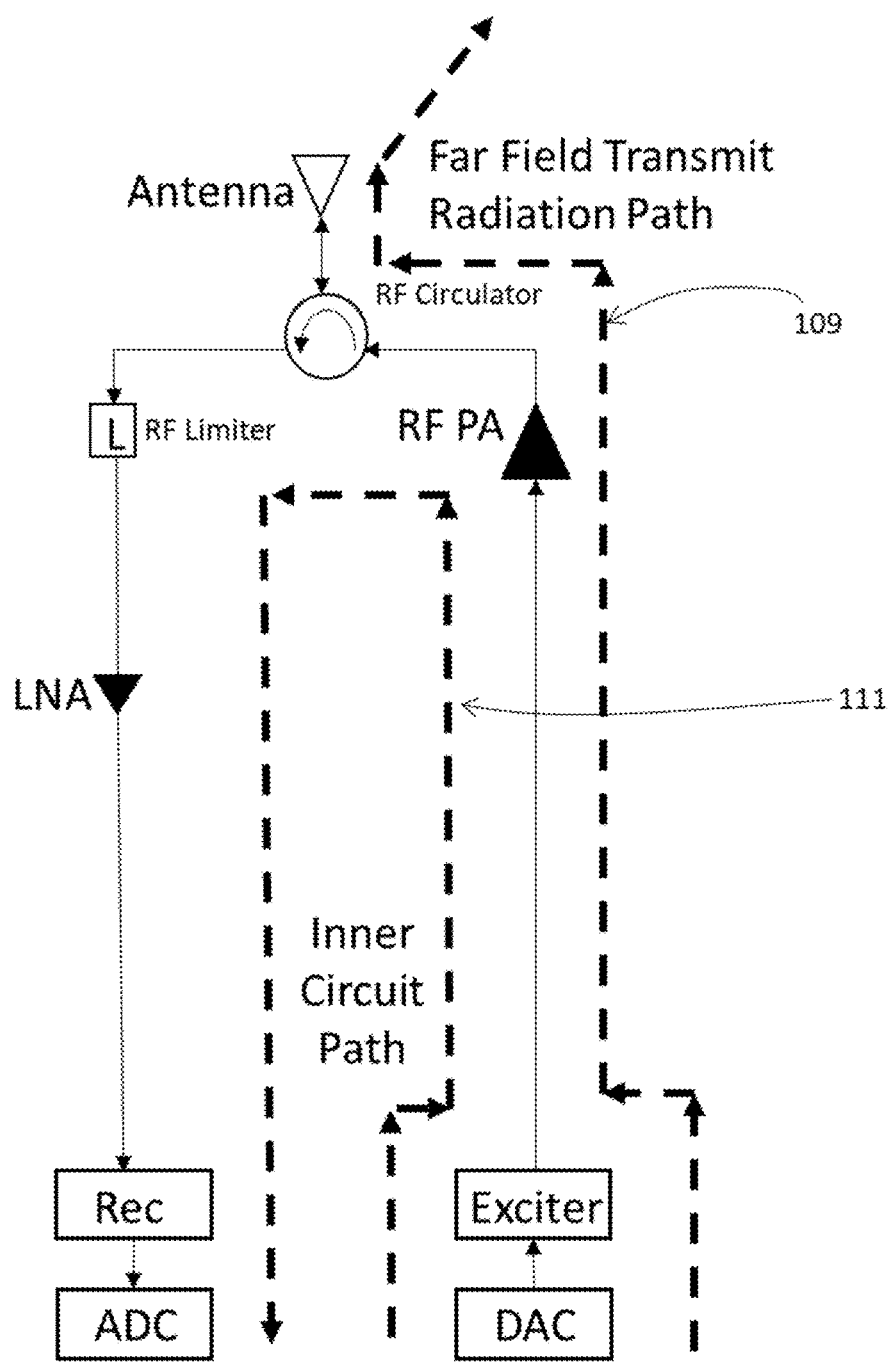
FIG. 5 shows a block diagram of a conventional Phased Array antenna channel using an RF Circulator, with two electrical paths: an inner circuit path and the desired Far Field Transmit Radiation Path.

FIG. 5 shows the block diagram of FIG. 4, using the RF circulator (112) instead of the Switch (108), showing the Far Field Transmit Radiation Path (109) and an Inner Circuit Path (111) for the system.

Figure 6:
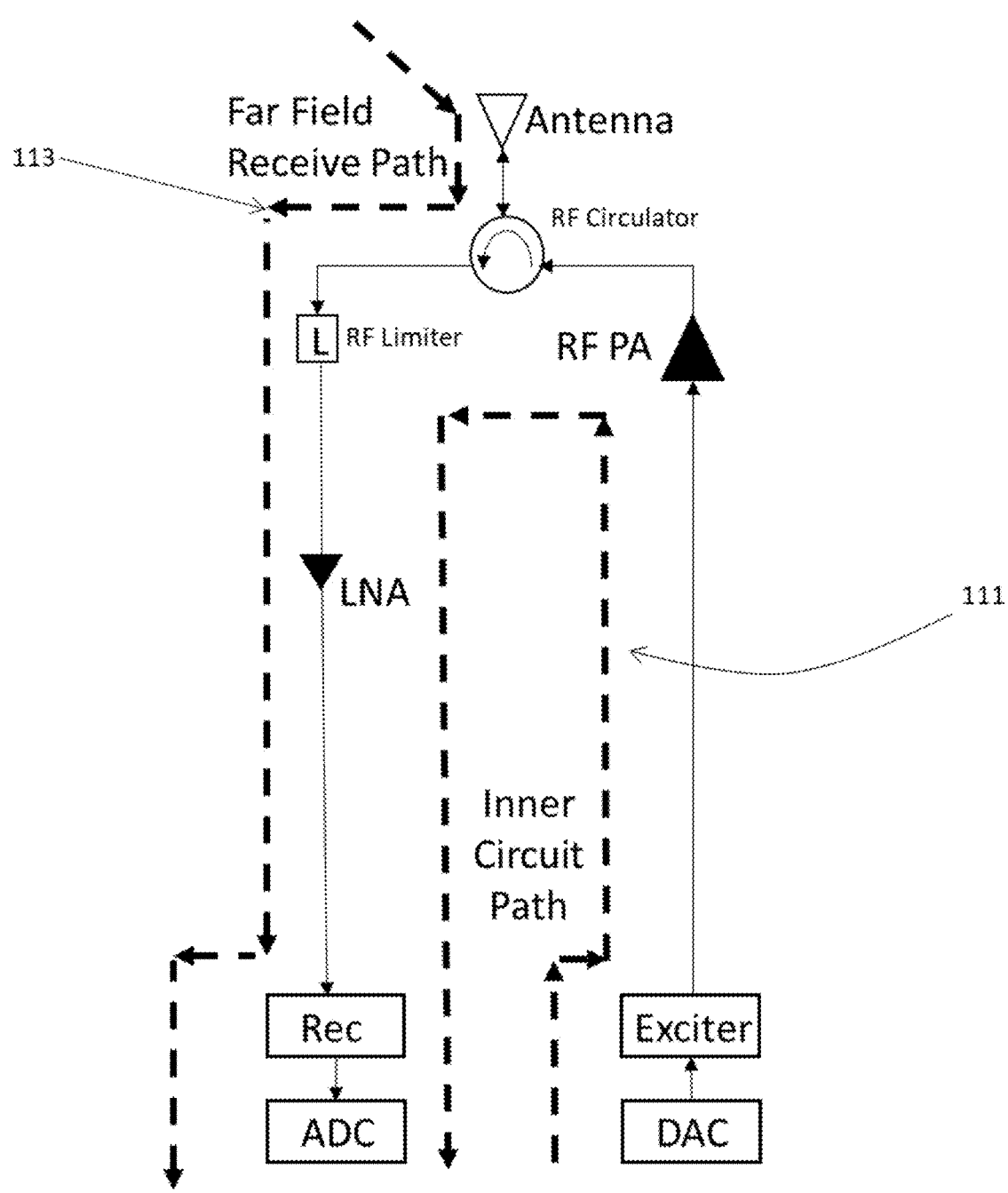
FIG. 6 shows a block diagram of a conventional Phased Array antenna channel using an RF Circulator, with two electrical paths: an inner circuit path and the Far Field Receive Path.

FIG. 6 shows the block diagram of FIG. 4, using the RF circulator (112) instead of the Switch (108), showing the Far Field Receive Path (113) and an Inner Circuit Path (111) for the system.

Figure 7:
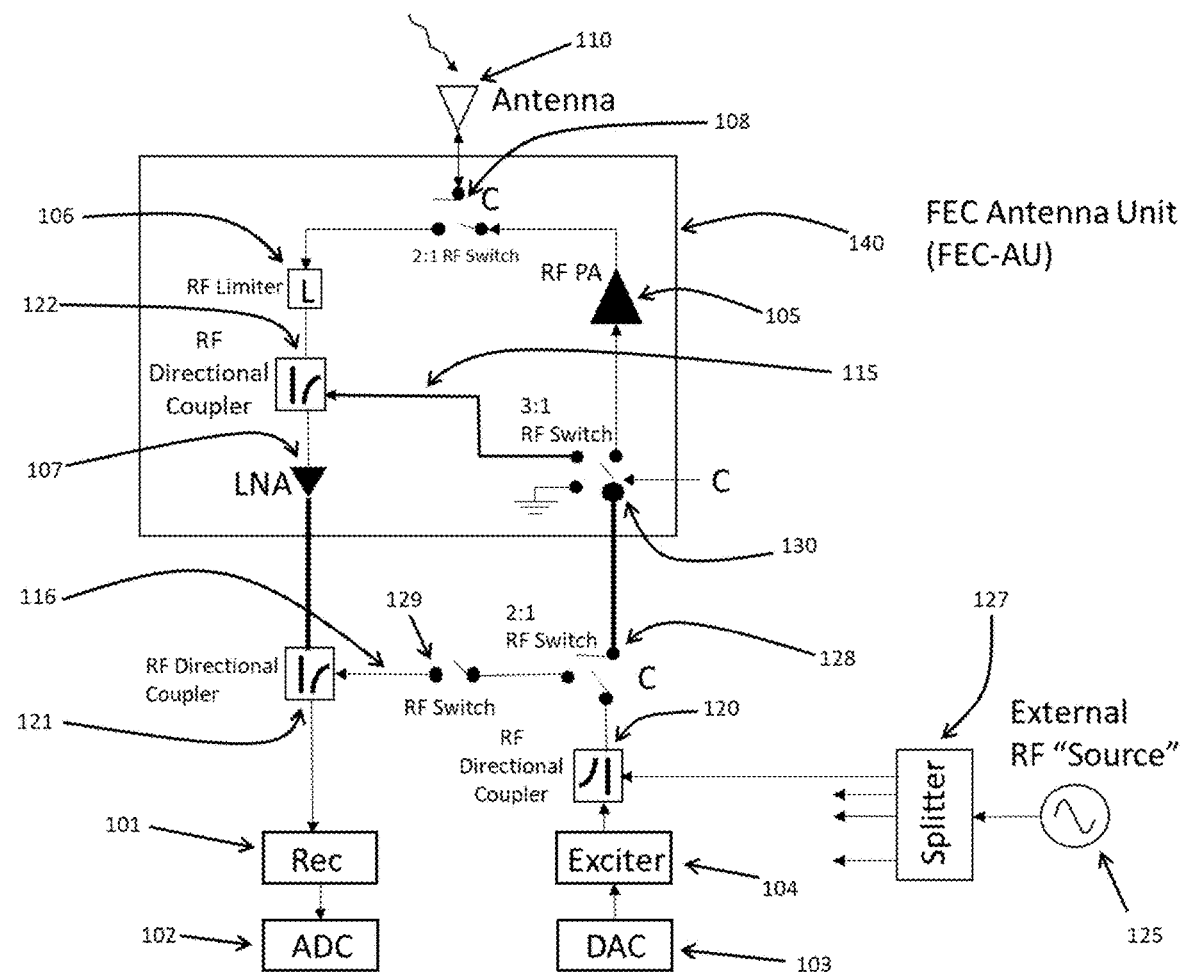
FIG. 7 shows the Inventor's circuit representation for the full Analog/RF embodiment of the FEC technique.

FIG. 7 shows the Inventor's circuit representation for the full Analog/RF embodiment of the FEC technique. Two critical circuit paths, (115) and (116), have been added to the system of FIG. 1, as well as a collection of RF directional couplers (120, 121, 122), and an independent/external RF source (127). The square (140), at the top represents system RF components that are located at or close to the Antenna. The components within this box are collectively denoted as the FEC Antenna Unit (FEC-AU), (140).

Each channel of the Internal RF Exciter Source system (104) can generate a signal (source), whether it be a calibration signal; that travels within the Internal Circuit Paths, or an actual signal to the Far Field, which is emitted or radiated from the Antenna (110) for each independent channel, i=1, 2, ..., M. These particular internal sources, for each independent transceiver/receiver channel, are designated as "Exciter" (104). The External RF Source (125), denoted simple as "Source", which is usually a separate synthesizer or signal generator, is split (copied) through an RF Splitter (127) where each split component of the source is fed and coupled (120) to the Exciter (104) output, for each $i^{th}$ channel.

Figure 8:
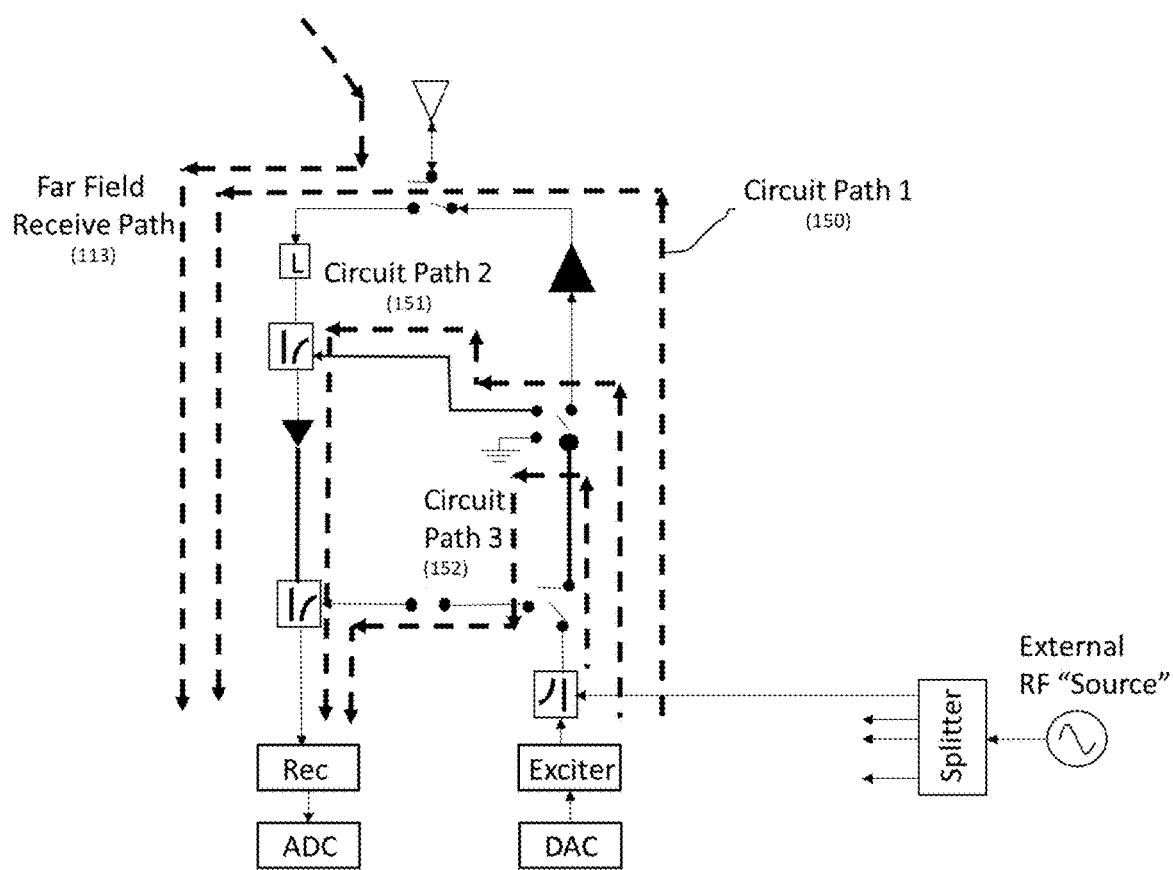
FIG. 8 shows the various calibration circuit paths that are used to compute and determine the vector phase length for each distinct component and RF transmission line length for each and every segment of the full system.
Figure 9:
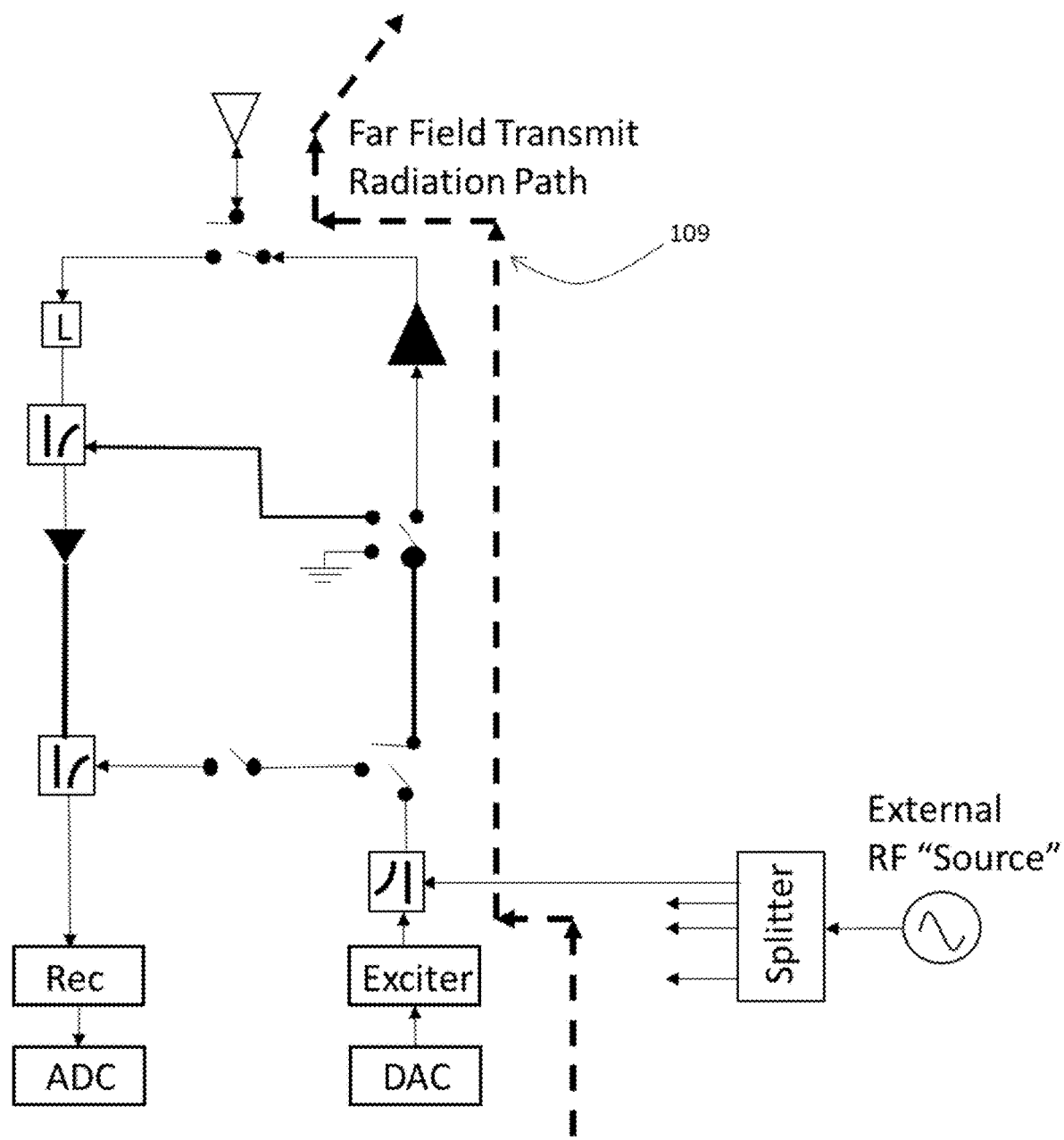
FIG. 9 shows the Far Field Transmit Path, using the internal RF Exciter Source as the Signal Source.

FIG. 8 shows the various calibration circuit paths that are used to compute and determine the vector phase length for each distinct component and RF transmission line length for each and every segment of the full system. There thus are Four (4) total separate paths that can be used to compute and calibrate each path (length) segment of the full system, to estimate the Phase Delays for the Far Field Transmit Radiation Path (109). These paths are: The Far Field Receive Path (113), Circuit Path 1 (150), Circuit Path 2 (151), and Circuit Path 3 (152). Each one of these distinct and individual paths can provide a signal to the Receiver (101) and ADC (102), in which signal samples can be obtained, for each path, during a pre-determined dwell time period, and to produce a data covariance matrix and finally a steering vector for each and every path. Notice that the Far Field Receive Path (113) includes not only the circuit path length from the Antenna (110) to the ADC (102) but also includes the distance from a Far Field Calibration Signal Source, not shown, to the Antenna (110).

Figure 10:
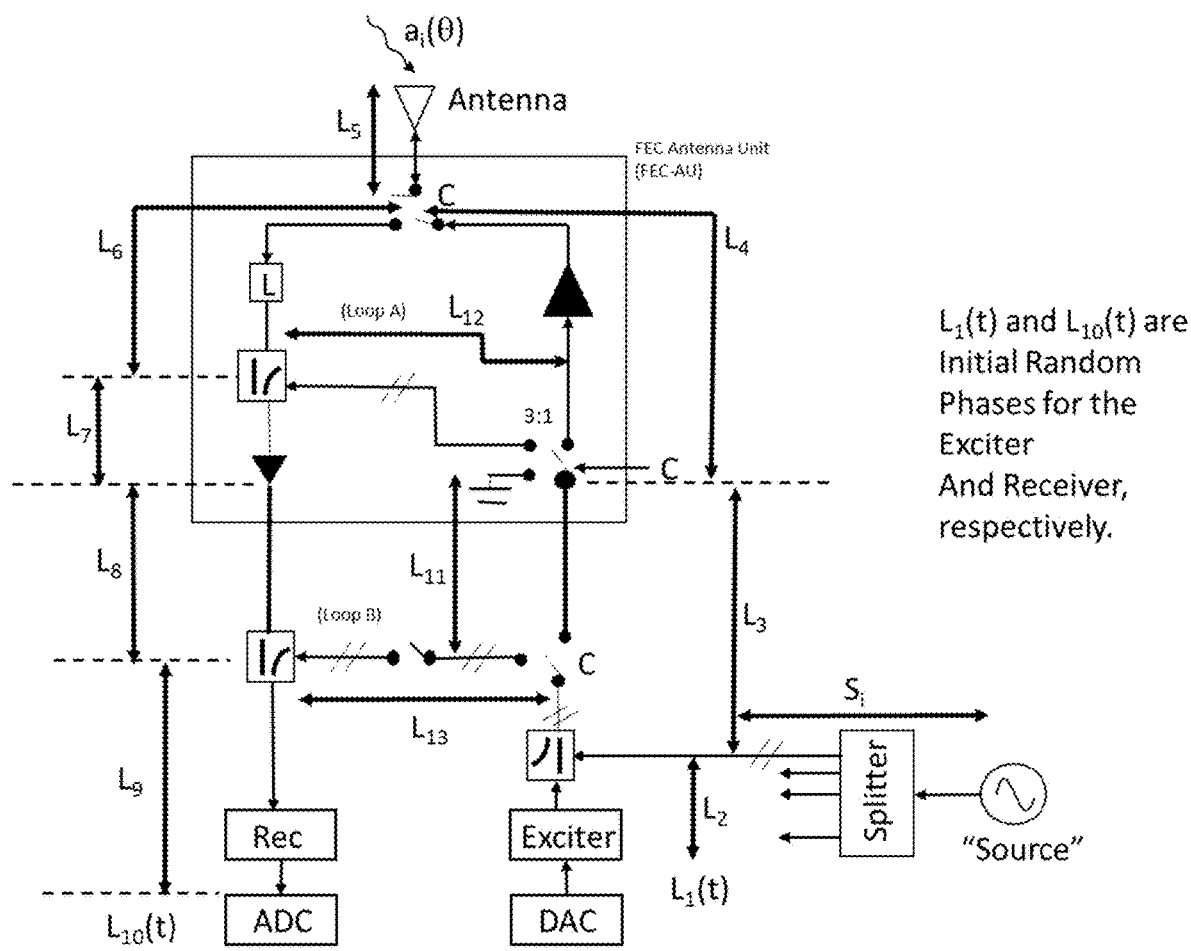
FIG. 10 shows the collection of all independent Circuit Path Lengths in the full system, labeled by section in terms of their Phase.

FIG. 10 shows the collection of all independent paths in the full system, broken into distinct phase length segments. Each circuit path represents a physical length of travel, that is subsequently converted to time and then phase, and therefore a finite time delay of a signal along each path. It should be noted that since these signals are based on electron movement in transmissions lines, and that these signals do not travel at the speed of light. Since electrons have mass, they can never in fact, reach the velocity of light. In fact, due to different materials and frequencies, the travel time through each wire, cable, transmission line, or active or passive RF component, will likely be different. Note also, it is assumed that many of these paths are not time-stationary, and could change due to temperature effects, or where for example a cable or component may be replaced in the field due to damage or failure. Thus, it is not assumed that a replacement component, due to damage or age, will have the same effective component path length nor time delay as the previous component. In fact, as will be shown, the FEC system and technology completely compensates for this resultant, and can calibrate out the time delay difference between the old component and the new component. Therefore, most of the vast many paths, $L_1$ through $L_{13}$, can all be estimated in real time. Note however, that a few paths, composed of PC Board traces, would be treated as constant and not varying over time, or from a component change-out, since PCB tolerances are very high.

Two of the most important, yet subtle components of this configuration are circuit path length components (time delays) $L_8$ and $L_{11}$. These two components represent RF transmission lines, or cables from the Exciter & Receiver system to the channel antenna. In many past systems, to control or know the phase delay, all the $L_8$ and $L_{11}$ cables or other transmission line were fabricated and verified as RF Phased Matched. That is, each and every cable would be the same length, for each i channel. As mentioned in the Background Section, this solution is both expensive and often winds up having many cables that are rolled up, which increases system size and weight. Thus, while the FEC technique corrects for all phase and amplitude variations and changes in the system, it also corrects for non-equal length RF cables. Therefore, this novelty, system, and solution does not required any phased matched cables, at all, within a phased array system. This is a very powerful benefit.

Figure 11:
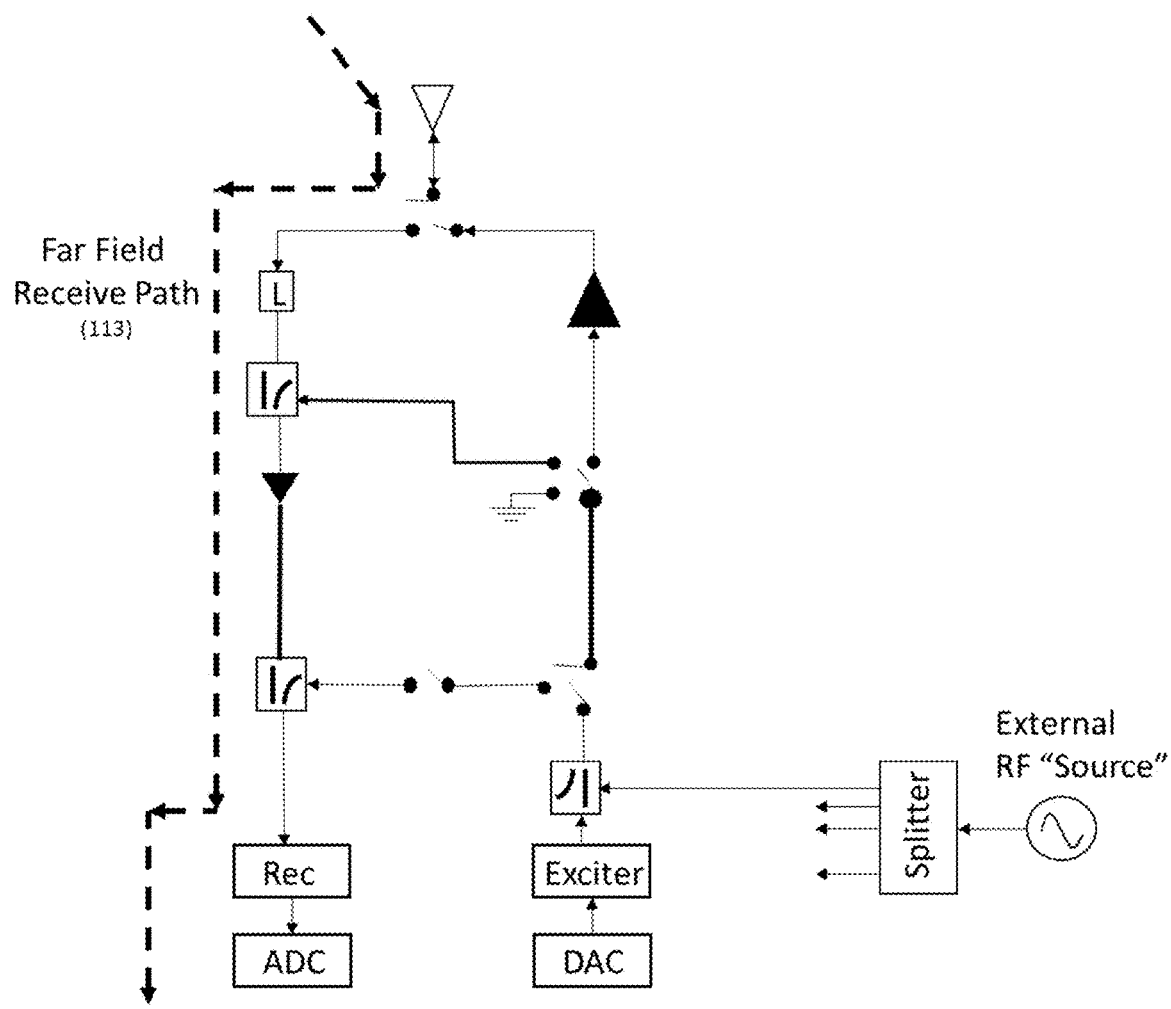
FIG. 11 shows the shows the Far Field Receive Path.

FIG. 11 shows the full Far Field Receive Path (113), including the path from the Antenna to a Far Field Calibration source, not shown.

Figure 12:
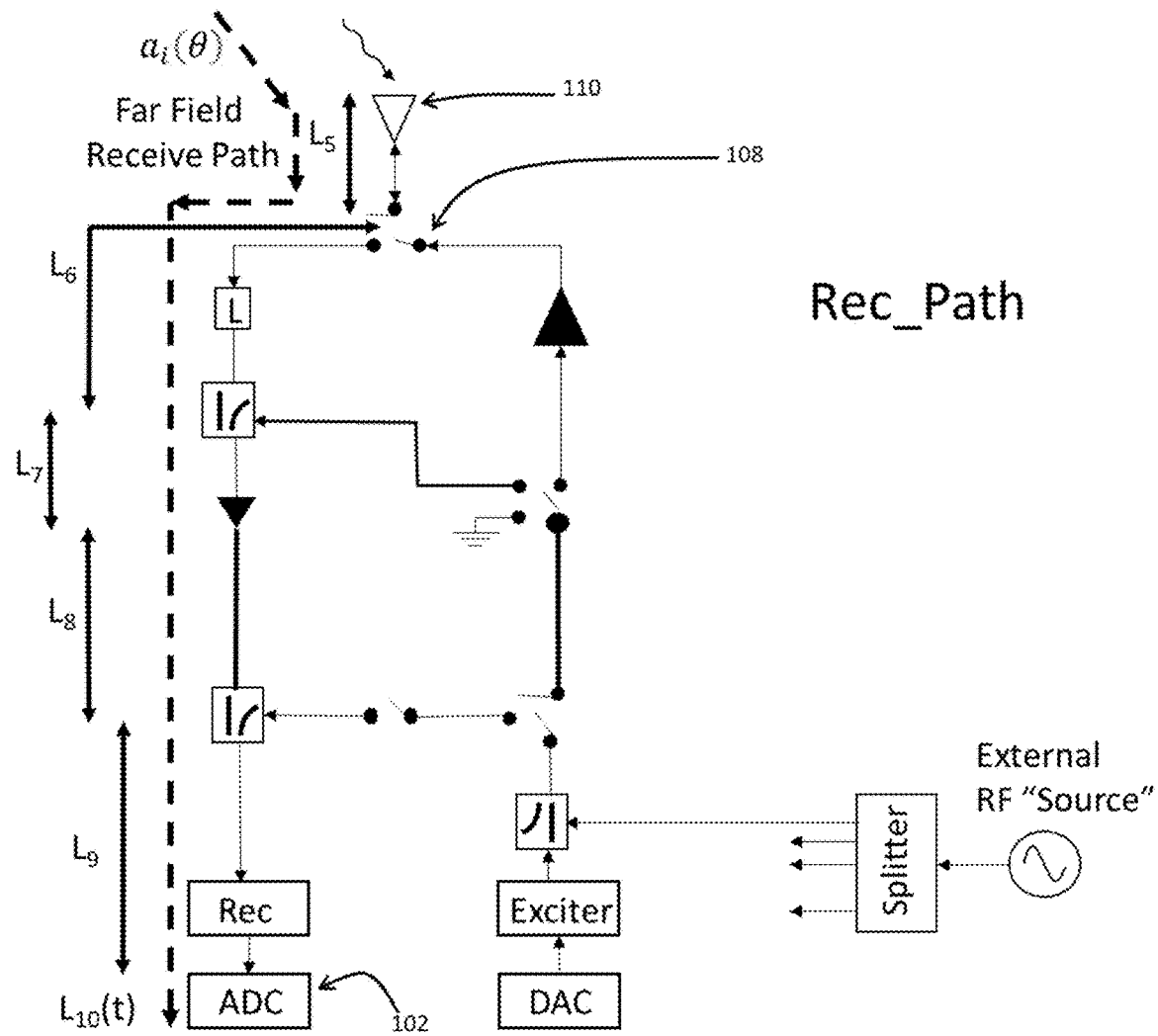
FIG. 12. shows the Far Field Receive Path as well as all the path length segments that comprise the total Far Field Receive Path, from the Far Field Calibration Source through the ADC.

FIG. 12 shows the same Far Field Receive Path (113) as well as all the path length segments that comprise the total Far Field Receive Path (113), from the Far Field Calibration Source through the ADC (102). Not that the path distance from the Antenna (110) to the Far Field Calibration Source is denoted as $\alpha_i(\theta)$, which is a function of the angle to the Far Field Calibration Source, $\theta$. This component, $\alpha_i(\theta)$, is denoted as the Far Field Complex Steering Vector value for Array Antenna i. Therefore, $\alpha(\theta)$, is denoted as the Far Field Complex Steering Vector. Ass an example, the physical length from the Antenna (110), and including the antenna, to the Switch (108) is denoted as a physical distance L5. Later in this document, it will be shown how to convert from physical distance to vector phase.

Let $t_1$=time of Far Field calibration operation, or Depo Calibration.

$t_2$=time of beamformer operation.

$t_2, t_3, \ldots, t_k$ are sequential beamformer (operation) times, to boresight various paths. It should be noted that the initial time of full system calibration, $t_1$, can be very different (days to years) prior to the beamformer operation time, $t_2$. To state this more clearly, the time of the Depo Calibration, $t_1$, may be in the month of January. However, at some later time of use, say June, the times $t_2$ through $t_k$ will likely occur in less than a few seconds. It is assumed that the array system is fairly stationary during these few seconds. The beamformer operation time is any time period or interval when the system is in actual use. However, since the initial random phase of each channel is very stationary during the time interval from $t_2$ to $t_k$, and that it is assumed that the transceiver has not been reset or frequencies changed during this time interval then, effectively:

$$L_1(t_2)=L_1(t_3)=L_1(t_4)=\ldots L_1(t_k).$$

Similarly, it can be assumed that:

$$L_{10}(t_2)=L_{10}(t_3)=L_{10}(t_4)=\ldots L_{10}(t_k).$$

However, it is not assumed that:

$$L_1(t_1)=L_1(t_2) \text{ or that } L_{10}(t_1)=L_{10}(t_1).$$

or stated more clearly:

$$L_1(t_1) \neq L_1(t_2) \text{ and } L_{10}(t_1) \neq L_{10}(t_1).$$

For some systems, it can also be assumed that this stationarity might only be over a short time interval, say 10 to 60 seconds, due to active devices changing phase as they heat up or cool down, or due to any component aging effects. Thus, FEC calibration updates would likely need to be repeated every second or couple of seconds. This would mean that during system or beamformer operation times, $t_2$ through $t_k$, that FEC re-calibration would be repeated constantly; e.g. every few seconds.

The goal of this [FEC] process is to estimate the true beamformed path (109) of the signal, in the transmit direction, thus to obtain the Forward Steering vector, the amplitude and phase vector for the total Far Field Transmit Radiation Path:

$$\text{Forward Steering Vector} = e^{j\frac{\omega}{c}(L_1(t_2)+L_2+L_3+L_4+L_5+a_i(\theta))}$$

$$= e^{j\frac{\omega}{c}(\Delta L_{TP}(t_2)+a_i(\theta))}$$

Where:

$a_i(\theta)$ represents the path from a point in the far field, to an antenna i, and at $\theta$ degrees. This also demonstrates, using the system radial frequency, $\omega$, the speed of light, c, and j=square root of $-1$, how one converts from physical length to electrical phase, and thus the vector representation of phase.

and $\Delta L_{TP}(t_2)=L_1(t_2)+L_2+L_3+L_4+L_5$ which is a value of physical length.

This value of $\Delta L_{TP}(t_2)$ represents the net path (distance) delays from the Digital to Analog Converter (DAC), (103), through the exciter (104) and up through the antenna (110), for antenna i. This also includes any random initial phase (length), $L_1(t_2)$, in the exciter (104). Therefore, each beamformed correction weight, for a given antenna, can be represented as:

$$w = e^{j\frac{\omega}{c}(\Delta L_{TP}(t_2)+a_i(\theta))}$$

Where the expression on the right is assumed to be a unique weight for each independent transmit channel, i. Prior to FEC system calibration and boresighting, this total circuit path length (weight), for array antenna channel i (i=1, 2, ..., M), is unknown. Since internal DAC (103) and Exciter (104) PCB paths lengths are typically unknown, and can be different from channel to channel, and the RF PA (105) can have a phase change in both time and across frequency while heating up, there really is no known method to estimate and compensate for the various path lengths $L_i$. These must be measured.

During operation, if a coherent signal is transmitted, from each antenna element i=1,2, ..., M, it can be beamformed to a point in the Far Field, using:

$$w^* \cdot e^{j\frac{\omega}{c}(\Delta L_{TP}(t_2)+a_i(\theta,f))} = 1$$

The ultimate goal of the FEC process is to produce a set of weights for each frequency, such that with knowledge of the far field steering vector, $a_i(\theta, f)$, that transmission can be effectively emulated from an exact planar array with phased matched cables to each antenna (110). The FEC method, in fact does not require the use of any phase matched cables from the Exciter(s) (104), to the FEC Antenna Unit (FEC-AU), (140), nor any phased matched cabled from the FEC-AU (140) to the Receiver(s) (101).

One requirement of the FEC technique is the generation of the receive system response, which is also termed the 'Array Manifold" in many published documents. However, most publications only include the path from the far field source to each antenna (110). The true Array Manifold, or system steering vectors will not only include the far field steering vector, $\alpha_i(\theta, f)$, but will also include any and all paths lengths up to and through each channel ADC (102). It should also be mentioned that the steering vector component, $a_i(\theta, f)$, for the receive (reverse) direction is identical to the steering vector component for the transmit (forward) direction. This is due to reciprocity in both the spatial path as well as the operation of antennas, which are reciprocal devices.

Therefore, the signal transmitted from a far field calibration source is received and the System steering vector for the $i^{th}$ antenna or channel can be presented as:

$$\text{Far Field Receive Path}(t_1) = e^{j\frac{\omega}{c}(a_i(\theta)+L_5+L_6+L_7+L_8+L_9+L_{10}(t_1))}$$

This is shown more clearly in FIG. 12.

The Far Field Receive Path (Boresighting), shown in FIG. 12, is performed at time $t_1$. This could be days, weeks, months, or even years from when the actual system is used in operation, and thus FEC Boresighting (calibration) is performed. This receive path calibration, at time $t_1$, is therefore used to obtain the Total Effective Steering Vectors (e.g. Array Manifold) for the system, which we denote as the Far Field Receive Path. This would be the same steering vectors that would be stored for a Direction Finding application.

There are four possible inner circuit boresight paths, enabled within the current system, which all go through the FEC Antenna Unit (FEC-AU), (140), which do not include the reflection paths (which will be covered later in this document):

1. Bore Inner Source:

$$B_{inner,source}(t_i) = e^{j\frac{\omega}{c}(S_1+L_3+L_{12}+L_7+L_8+L_9+L_{10}(t_i))}$$

Figure 13:
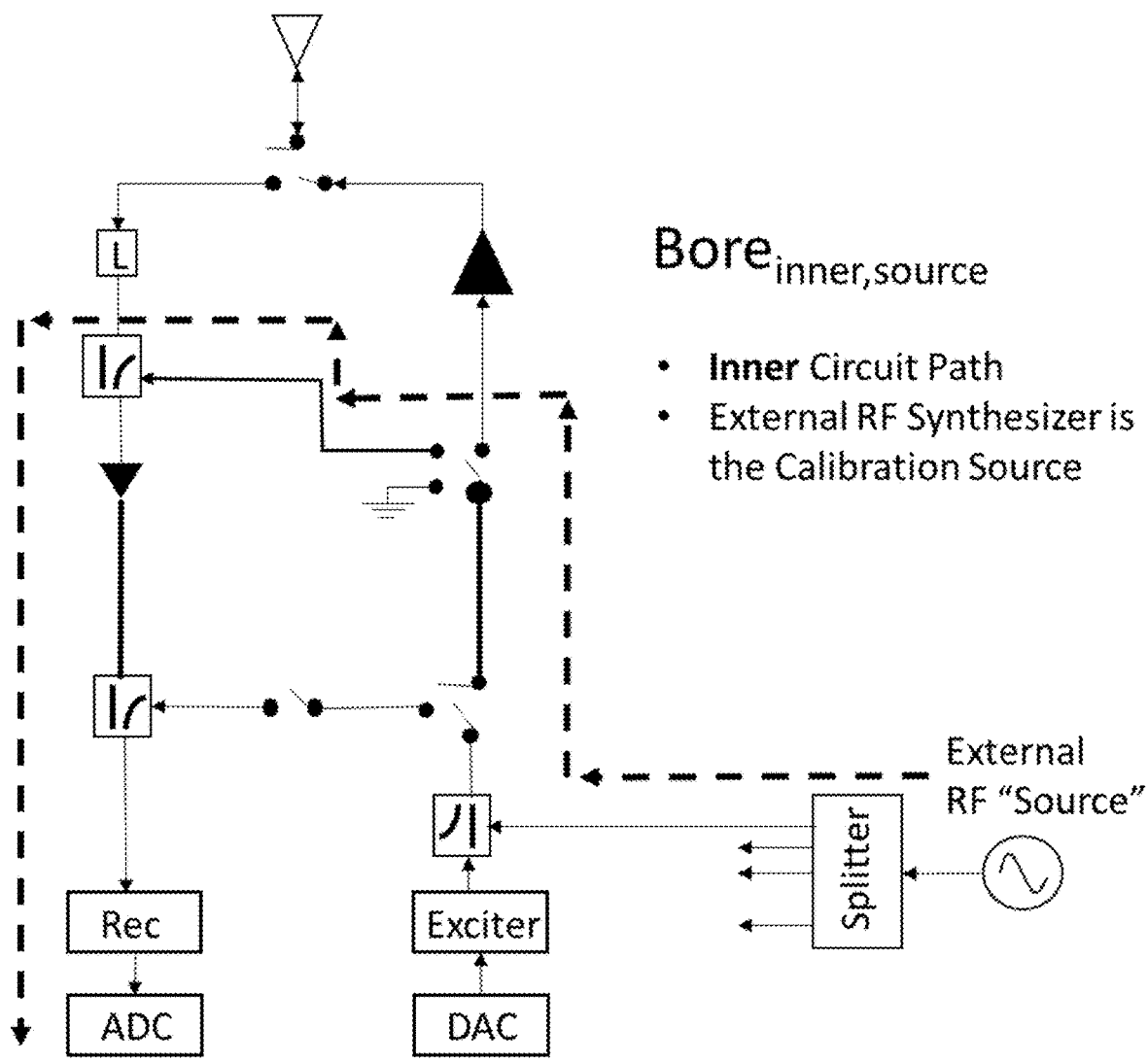
FIG. 13 shows the Bore (measurement) Inner Circuit Path, using the External RF Source as the calibration source.

This Path is shown in FIG. 13.

2. Bore Inner Exciter:

$$B_{inner,exc}(t_i) = e^{j\frac{\omega}{c}(L_1(t_i)+L_2+L_3+L_{12}+L_7+L_8+L_9+L_{10}(t_i))}$$

Figure 14:
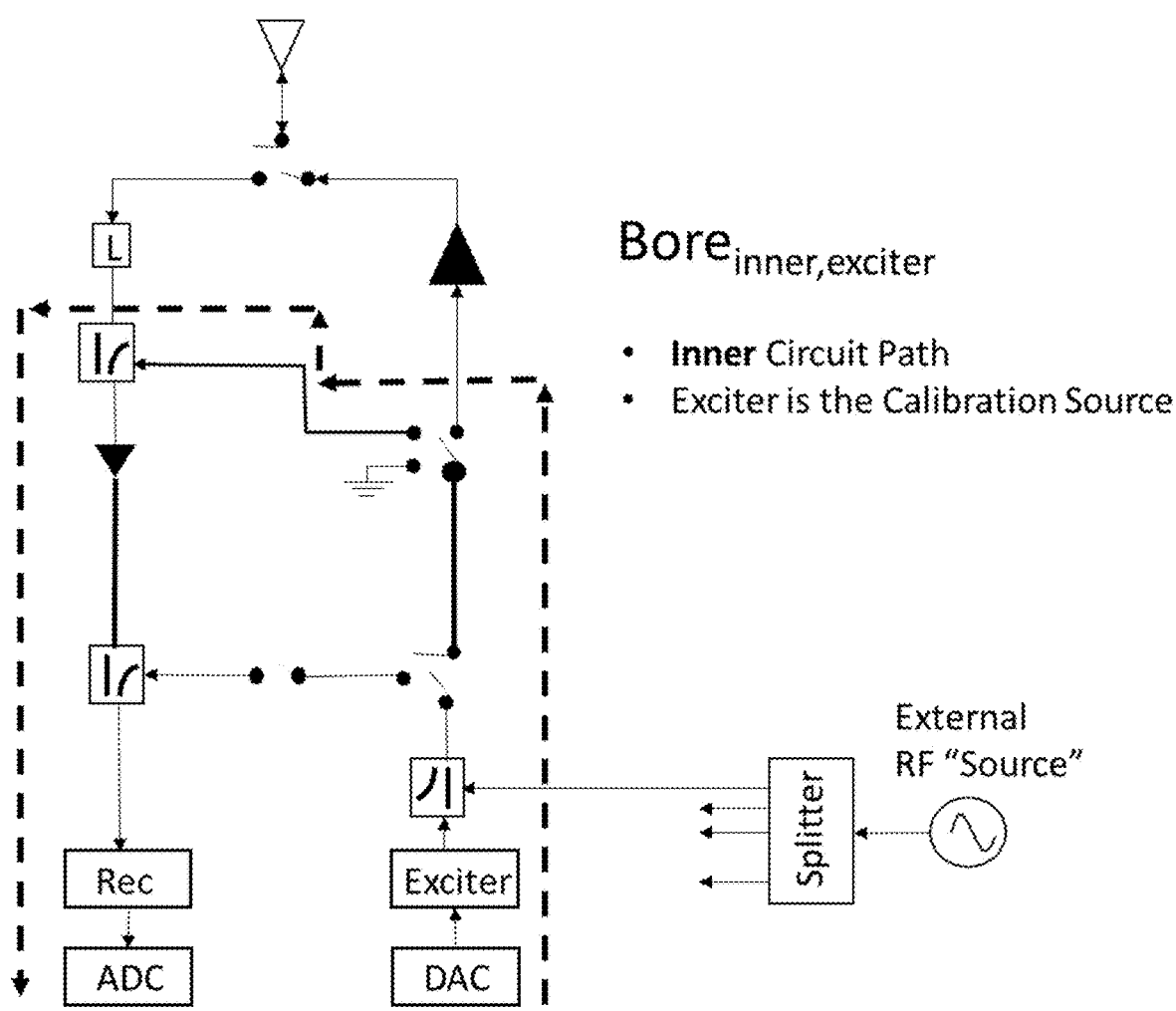
FIG. 14 shows the Bore Inner Circuit Path, using the Internal RF Exciter Source as the calibration source.

This Path is shown in FIG. 14.

3. Bore Outer Source:

$$B_{outer,source}(t_i) = e^{j\frac{\omega}{c}(S_1+L_3+L_4+L_6+L_7+L_8+L_9+L_{10}(t_i))}$$

Figure 15:
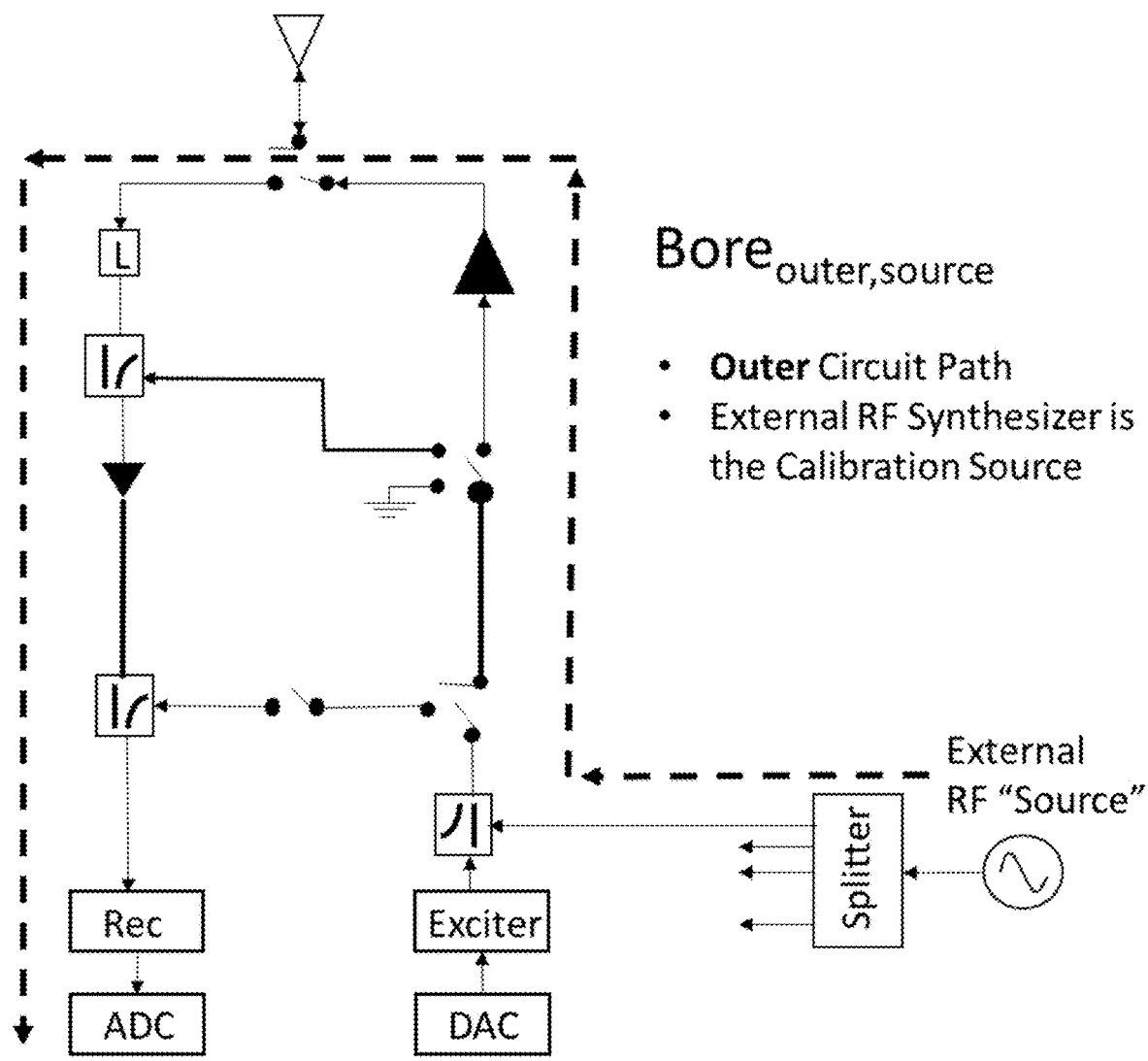
FIG. 15 shows the Bore (measurement) Outer Circuit Path, using the External RF Source as the calibration source.

This Path is shown in FIG. 15.

4. Bore Outer Exciter:

$$B_{outer,exc}(t_i) = e^{j\frac{\omega}{c}(L_1(t_i)+L_2+L_3+L_4+L_6+L_7+L_8+L_9+L_{10}(t_i))}$$

Figure 16:
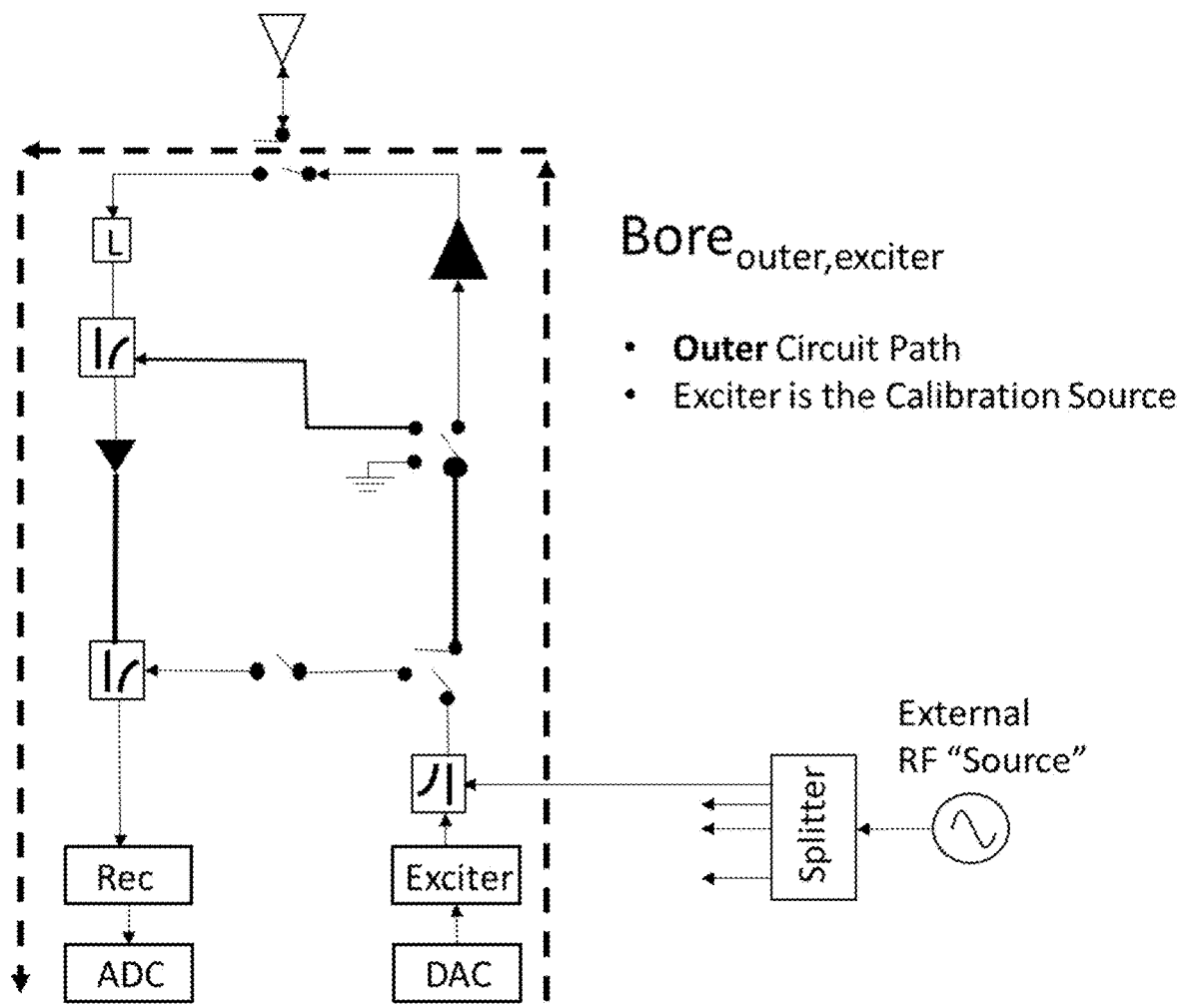
FIG. 16 shows the Bore Outer Circuit Path, using the Internal RF Exciter Source as the calibration source.

This Path is shown in FIG. 16.

The specific time $t_i$ for each of these four (4) paths, can be (measured) anytime at $t_2$ or afterwards. Additionally, these four (4) paths do not have to be measured in any particular order, but do need to be performed within a time period as close to each other as possible. That is, all four of these measurements should be performed within a total of one or two seconds.

The first word, "Bore" simply represents a measurement. That is, a bore-sighting measurement in which the particular boresight vector is computed through sampling of the representative path, and integrating samples to produce an averaged vector resultant. This vector is obtained through collection of channel time samples, formation of a sampled covariance matrix, decomposition, and selection of the eigenvector associated with the dominant eigenvalue.

The words "Inner" and "Outer" refer to the particular circuit path chosen. For example, the Inner path would use $L_{12}$, and the Outer path would use $L_4+L_6$ (as shown in FIG. 10). These two paths are selected in the 3:1 RF Switch (130) at the bottom right of the FEC-AU box (140). Source (125), the External RF source, and Exciter (104), the Internal RF Exciter Source, are chosen based on which RF source is selected, for a specific calibration path. It could be assumed that for $S_i$ (RF Splitter length) values, that for each $S_i(t)$, it is assumed that the External Source (125) and RF Splitter (127) is connected to the RF Exciter (104) Channels with equal length (PCB) transmission lines. That is, that the full External Source (125), RF Splitter (127), and Transmission lines comprising $S_i$ different paths (i=1, . . . , M) are all designed as equal length PCB traces. However, even if these paths are slightly different, it will not affect the results. This will be proven later. Thus, the $S_i$ paths, one for each channel, do not have to be phased matched.

During the calibration receive phase, during time $t_1$, the system receives and generates two signals:

$$\text{Far Field Receive Path}(t_1) = e^{j\frac{\omega}{c}(a_i(\theta)+L_5+L_6+L_7+L_8+L_9+L_{10}(t_1))}$$

and $$B_{inner,source}(t_1) = e^{j\frac{\omega}{c}(S_1+L_3+L_{12}+L_7+L_8+L_9+L_{10}(t_1))}$$

These two values are taken at exactly the same time, with the 3:1 switch (108) set to the Inner Circuit Path, and use either snapshot-by-snapshot boresighting or covariance boresighting. This process is covered in the Inventor's patent Ser. No. 10/185,022. The resultant is then to generate, via unwrapping and phase & amplitude interpolation, a calibration table (or array manifold), which includes the boresighted correction phases. This cal table can be denoted as:

$$a_{cal,i}(\theta) = \frac{\text{Receive Path}(t_1)}{B_{inner,source}(t_1)}$$

$$= \frac{e^{j\frac{\omega}{c}(a_i(\theta)+L_5+L_6+L_7+L_8+L_9+L_{10}(t_1))}}{e^{j\frac{\omega}{c}(S_1+L_3+L_{12}+L_7+L_8+L_9+L_{10}(t_1))}}$$

$$= \frac{e^{j\frac{\omega}{c}(a_i(\theta)+L_5+L_6)}}{e^{j\frac{\omega}{c}(S_1+L_3+L_{12})}}$$

It should be noted, that $L_3$, $L_5$, $L_6$, and $L_{12}$ are currently unknown values, and since we are not relying on any cable or transmission line phase matching, their exact time-lengths cannot be reliably estimated prior to system integration.

Additionally, as mentioned prior, the values of $L_6$ and $L_{12}$ will be assumed to be extremely equivalent, from channel to channel, since these component path lengths will be (repeatable) lengths on a PC board.

A fundamental assumption for FEC is that manufacturing repeatability and tolerances (accuracy) can be held to under 0.1 mil error in current PCB design and fabrication. At even 10 GHz carrier frequency, where the wavelength is 0.03 meters (1.18 inches), this represents an error of 0.000084 times (or 0.1×0.001"/1.18"). In phase degrees, this would be:

Phase error=k*length error(radians)

=(2*pi/lamda)*(0.1×0.001")

=(2*pi/1.18")*(0.0001")

=0.0005 radians

=0.0305 electrical degrees

Thus, even at 10 GHz, this represents an extremely small (phase) error.

Therefore, since values of $L_6$ and $L_{12}$ will can be assumed exactly equivalent from channel to channel, then:

$$a_{cal,i}(\theta) = \frac{e^{j\frac{\omega}{c}(a_i(\theta)+L_5)}}{e^{j\frac{\omega}{c}(S_1+L_3)}}$$

$$= e^{j\frac{\omega}{c}[a_i(\theta)+L_5-L_3-S_1]}$$

Using this novel forward correction circuitry and algorithms, it is now possible to ultimately calibrate out all unknown paths, and solve for the unknown Forward Steering Vector for the Far Field Transmit Radiation Path (109), for all array antenna channels.

To obtain $L_1(t_1)+L_2$:

$$B_{inner,source}(t_2) \cdot (B_{inner,exc}(t_2))^* = e^{j\frac{\omega}{c}(S_1-L_1(t_2)-L_2)}$$

or $$(B_{inner,source}(t_2))^* \cdot B_{inner,exc}(t_2) = e^{j\frac{\omega}{c}(L_1(t_2)+L_2-S_1)}$$

To obtain $L_3$, there are two methods. The first is denoted as the Direct Measure Method.

Direct Measure Method:

Currently, the length of long (coax) cables $L_3$ are unknown.

One method to obtain $L_3$ is simply to connect the end of the $L_3$ cable (at the FEC-AU) directly to the receiver (101); and use the source (125). This measurement gives us:

$$B_{with\ L3}(t_i) = e^{j\frac{\omega}{c}(S_1(t_i)+L_3+L_8+L_9+L_{10}(t_i))}$$

Next, connect the source (125) directly to the receiver (101), omitting cable $L_3$. This measurement gives:

$$B_{without\ L3}(t_i) = e^{j\frac{\omega}{c}(S_1(t_i)+L_8+L_9+L_{10}(t_i))}$$

Conjugate multiplication of these two vectors, results in:

$$B_j = B_{with\ L3}(t_i) \cdot ((B_{without\ L3}(t_i))^* = e^{j\frac{\omega}{c}(L_3)}$$

The disadvantage of this method is that it needs to be repeated if a cable (L3) fails and needs to be replaced. However, the complete process still negates the need for phased matched cables.

Figure 17:
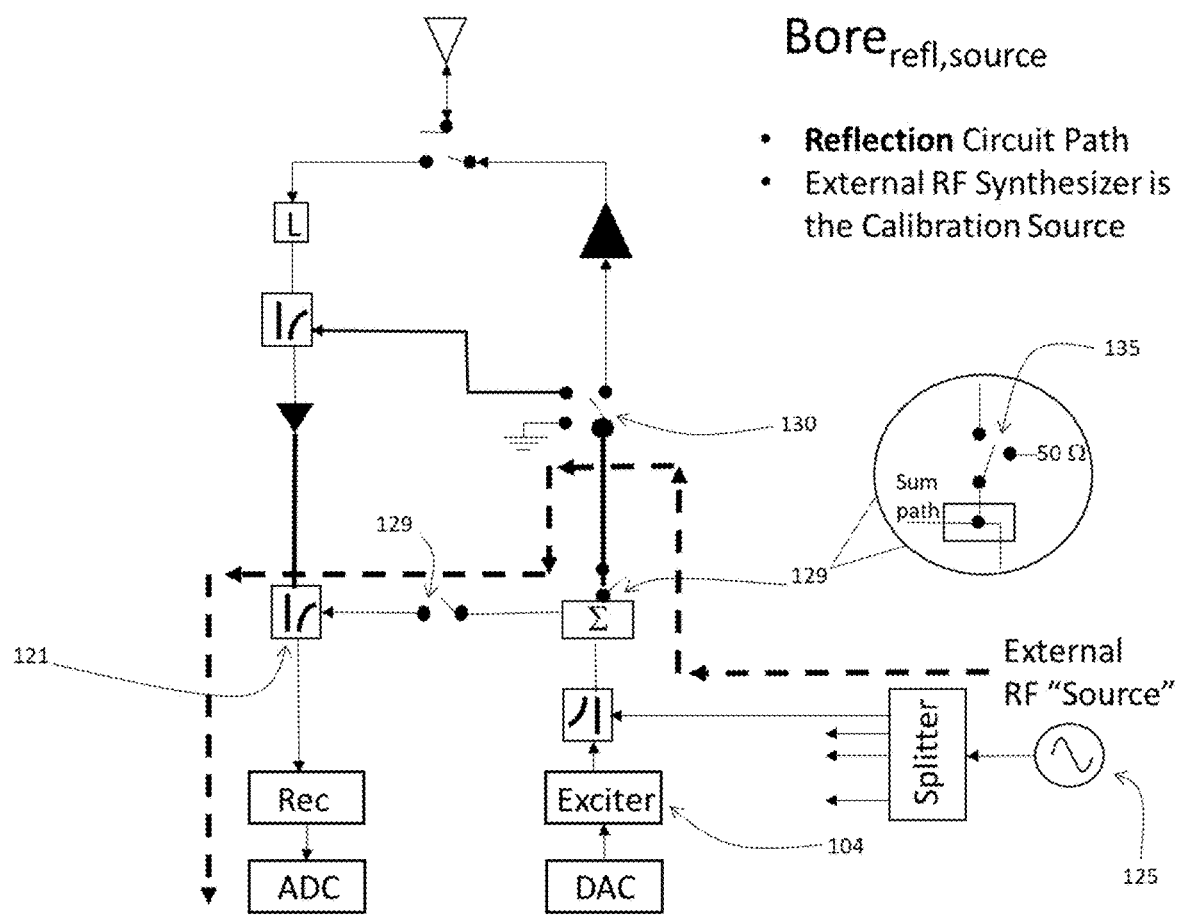
FIG. 17 shows the Reflection Circuit Path, using the External RF Source as the calibration source.
Figure 18:
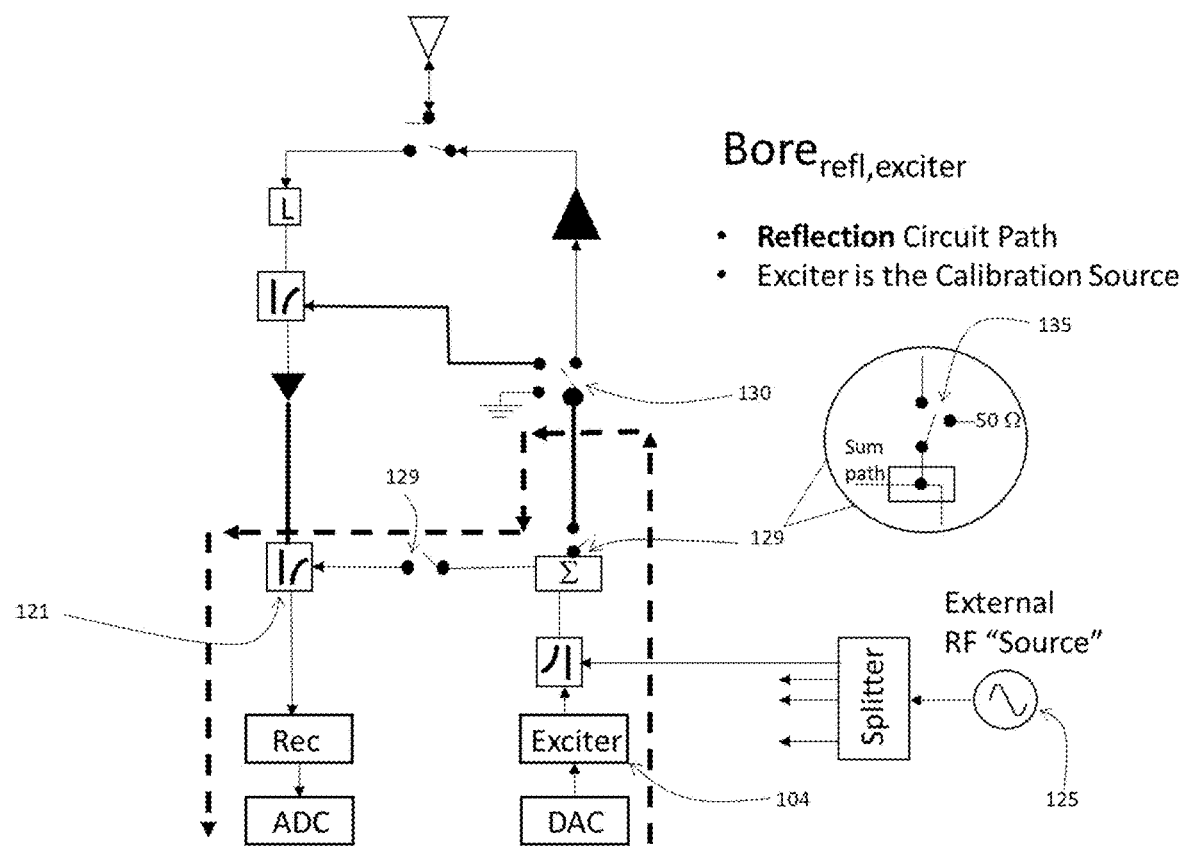
FIG. 18 shows the Reflection Circuit Path, using the internal RF Exciter Source as the calibration source.

The second method is the Reflectometry Method. In this method we inject a source (125), External RF Source, signal, as shown in FIG. 17, with the 3:1 switch (130) set to the "short" position. This reflects a signal which is measured at the receiver (101). The switch (128) in FIG. 7 is now replaced by a 2:1 RF summer (129), and a different 2:1 switch with 50Ω termination on one switch port, shown in FIG. 17.

The 2 $L_{11}$ path difference, the sum length of $L_{11}$ in both the forward and reverse direction, is measured through $L_{13}$.

Then the 2:1 switch (135) is thrown, which terminates the sum port path, and another measurement is performed. Subtraction of these two vectors gives 2 times $L_{11}$.

To obtain $L_3$, use the TDR method to obtain $L_{11}$ $$TDR_{source}(t_2) = e^{j\frac{\omega}{c}(S_1+L_{11})}$$

However, $$e^{j\frac{\omega}{c}(L_{11})} \approx e^{j\frac{\omega}{c}(L_3)}$$

Since the lengths within each coupler, on the PCB, should be equivalent from channel to channel. Note that $L_3$ includes the length of the coupler.

Therefore:

$$TDR_{source}(t_2) \approx e^{j\frac{\omega}{c}(S_1+L_3)}$$

This should be the same as:

$$TDR_{source}(t_1) \approx TDR_{source}(t_2) \approx e^{j\frac{\omega}{c}(S_1+L_3)}$$

Both of the conventional methods to obtain $L_3$, obtain the same results as the TDR method, thus:

$$B_j \approx TDR_{source}(t_2) \approx e^{j\frac{\omega}{c}(S_1+L_3)}$$

However, the TDR method is automated, quicker, and allows for change outs of new cables, without the need for physical re-calibration.

To get $L_4$, using the source only, is:

$$B_{inner,source}(t_2) \cdot (B_{outer,source}(t_2))^* = e^{j\frac{\omega}{c}(L_{12}-L_4-L_6)} \approx e^{j\frac{\omega}{c}(-L_4)}$$

or $$(B_{inner,source}(t_2))^* \cdot B_{outer,source}(t_2) \approx e^{j\frac{\omega}{c}(L_4)}$$

The $S_i$ components, which go through both inner and outer measures are cancelled out due to the conjugate multiplication.

Another means to obtain $L_4$, using the exciter only:

$$B_{outer,exc}(t_2) \cdot (B_{inner,exc}(t_2))^* = e^{j\frac{\omega}{c}(L_{12}-L_4-L_6)}$$

$$B_{outer,exc}(t_2) \cdot (B_{inner,exc}(t_2))^* = e^{j\frac{\omega}{c}(L_1(t_i)+L_2+L_3+L_4+L_6+L_7+L_8+L_9+L_{10}(t_i))} \cdot$$

$$e^{-j\frac{\omega}{c}(L_1(t_i)+L_2+L_3+L_{12}+L_7+L_8+L_9+L_{10}(t_i))}$$

$$= e^{j\frac{\omega}{c}(L_4+L_6-L_{12})}$$

$$= e^{j\frac{\omega}{c}(L_4)}$$

Thus $$B_{inner,source}(t_2) \cdot (B_{outer,source}(t_2))^* = B_{outer,exc}(t_2)(B_{inner,exc}(t_2))^*$$

Thus either of these can be used to obtain $L_4$.

So far, we have: $L_1(t)$, $L_2$, $L_3$, and $L_4$.

To get $L_5$ and $a_i(\theta)$:

$$\text{Far Field Receive Path } (t_1) \cdot (B_{inner,source}(t_1))^* = e^{j\frac{\omega}{c}(a_i(\theta)+L_5+L_6-L_3-L_{12}-S_1)}$$

However, $L_6$ and $L_{12}$ are similar from channel to channel, via exact length traces on a PCB, so $$\text{Far Field Receive Path } (t_1) \cdot (B_{inner,source}(t_1))^* = e^{j\frac{\omega}{c}(a_i(\theta)+L_5-L_3-S_1)}$$

Therefore, using:

$$B_j \approx TDR_{source}(t_2) \approx e^{j\frac{\omega}{c}(S_1+L_3)}$$

Then $$\text{Far Field Receive Path } (t_1) \cdot (B_{inner,source}(t_1))^* \cdot TDR_{source}(t_2) \approx e^{j\frac{\omega}{c}(a_i(\theta)+L_5)}$$

Putting this all together, and using:
a) The stored Bj or $TDR_{source}$ measurement, at time $t_0$.
b) The Far Field Receive Path measurement, at time $t_1$
c) The $B_{inner,source}$ measurement, at time $t_2$ or after
d) The $B_{inner,exciter}$ measurement, at time $t_2$ or after
e) The $B_{outer,source}$ measurement, at time $t_2$ or after The Forward (Transmit) path weights, or Forward Steering Vector, for the Far Field Transmit Radiation Path, can then be computed as:

$$\underline{w} = \frac{B_{inner,exc}(t_2) \cdot TDR_{source}(t_0) \cdot B_{outer,source}(t_2) \cdot \text{Receive Path}(t_1) \cdot TDR_{source}(t_0)}{B_{inner,source}(t_2) \cdot B_{inner,source}(t_2) \cdot B_{inner,source}(t_1)} \quad (L4)$$

$$= \frac{\text{Receive Path}(t_1)}{B_{inner,source}(t_1)} \cdot \frac{B_{outer,source}(t_2)}{B_{inner,source}(t_2)} \cdot \frac{B_{inner,exc}(t_2)}{B_{inner,source}(t_2)} \cdot TDR_{source}(t_0) \cdot TDR_{source}(t_0)$$

$$= a_{cal}(\theta) \cdot \frac{B_{outer,source}(t_2)}{B_{inner,source}(t_2)} \cdot \frac{B_{inner,exc}(t_2)}{B_{inner,source}(t_2)} \cdot TDR_{source}(t_0) \cdot TDR_{source}(t_0)$$

$$= a_{cal}(\theta) \cdot \frac{B_{outer,source}(t_2)}{B_{inner,source}(t_2)} \cdot \frac{B_{inner,exc}(t_2)}{B_{inner,source}(t_2)} \cdot B_j \cdot B_j$$

$$= \frac{e^{j\frac{\omega}{c}(a_i(\theta)+L_5+L_6)}}{e^{j\frac{\omega}{c}(S_1+L_3+L_{12})}} e^{j\frac{\omega}{c}(L_4)} e^{j\frac{\omega}{c}(L_1(t_2)+L_2-S_1)} e^{j\frac{\omega}{c}(S_1+L_3)} e^{j\frac{\omega}{c}(S_1+L_3)}$$

$$= e^{j\frac{\omega}{c}(L_1(t_2)+L_2+L_3+L_4+L_5+a_i(\theta))}$$

Which is the Forward Steering Vector for the Far File Transmit Radiation Path, at time $t_2$, or near $t_2$; assuming that the initial transceiver random phase, for each channel, is stationary. All of the $S_i$ components have also cancelled out, thus with the given Direct Measurement method, or TDR compensation method, it is not necessary to have any phase matching of $S_i$ paths.

Using the four (4) different boresighting paths, and their representative steering vectors, enables us to obtain a perfect replica of the desired Forward Steering vector for the Far Field Transmit Radiation Path, delay from the DAC (103) through the antenna (110) and including the far field antenna-to-target delay:

$$\text{Forward Steering Vector} = e^{j\omega/c(L_1(t_2)+L_2+L_3+L_4+L_5+a_i(\theta))}$$

An Alternative Method is:
a) The stored $B_j$ or $TDR_{source}$ measurement, at time $t_0$.
b) The Far field Receive Path measurement, at time $t_1$
c) The $B_{inner,source}$ measurement, at time $t_2$ or after
d) The $B_{inner,exciter}$ measurement, at time $t_2$ or after
e) The $B_{outer,exciter}$ measurement, at time $t_2$ or after $$\underline{w} = \frac{B_{inner,exc}(t_2) \cdot TDR_{source}(t_0) \cdot B_{outer,source}(t_2) \cdot \text{Receive Path}(t_1) \cdot TDR_{source}(t_0)}{B_{inner,source}(t_2) \cdot B_{inner,source}(t_2) \cdot B_{inner,source}(t_1)}$$

$$= \frac{\text{Receive Path}(t_1)}{B_{inner,source}(t_1)} \cdot \frac{B_{outer,source}(t_2)}{B_{inner,source}(t_2)} \cdot \frac{B_{inner,exc}(t_2)}{B_{inner,source}(t_2)} \cdot TDR_{source}(t_0) \cdot TDR_{source}(t_0)$$

$$= a_{cal}(\theta) \cdot \frac{B_{outer,exc}(t_2)}{B_{inner,exc}(t_2)} \cdot \frac{B_{inner,exc}(t_2)}{B_{inner,source}(t_2)} \cdot TDR_{source}(t_2) \cdot TDR_{source}(t_2)$$

$$= a_{cal}(\theta) \cdot \frac{B_{outer,exc}(t_2)}{B_{inner,source}(t_2)} \cdot TDR_{source}(t_2) \cdot TDR_{source}(t_2)$$

$$= \frac{e^{j\frac{\omega}{c}(a_i(\theta)+L_5)}}{e^{j\frac{\omega}{c}(S_1+L_3)}} \frac{e^{j\frac{\omega}{c}(L_1(t_i)+L_2+L_3+L_4+L_7+L_8+L_9+L_{10}(t_i))}}{e^{j\frac{\omega}{c}(S_1+L_3+L_7+L_8+L_9+L_{10}(t_i))}} e^{j\frac{\omega}{c}(S_1+L_3)} e^{j\frac{\omega}{c}(S_1+L_3)}$$

$$= e^{j\frac{\omega}{c}(L_1(t_2)+L_2+L_3+L_4+L_5+a_i(\theta))}$$

For very high SNR signals, it is not necessary to perform Eigen-based autocorrelation and Eigen decomposition to obtain steering vectors.

The Forward Steering Vector can now be multiplied by the input signal, s(t), prior the DAC, to properly weight each Array Antenna Channel, and steer the beam to any desired direction, $\theta$.

Figure 19:
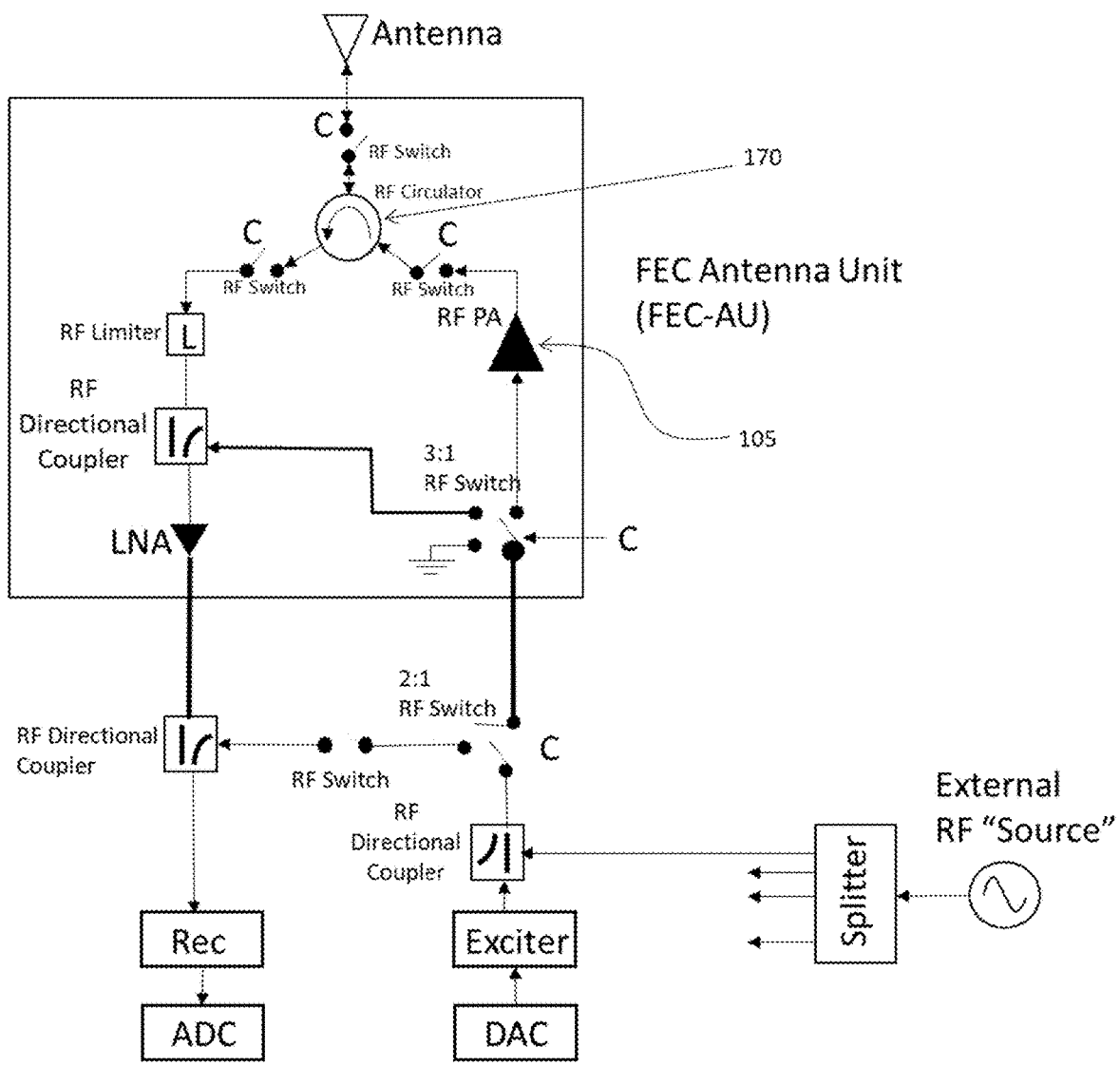
FIG. 19 shows the Inventor's circuit representation for the full Analog/RF embodiment of the FEC technique, however, using an RF Circulator instead of a 2:1 Switch.

An alternative system, shown in FIG. 19, using a Circulator (170) in place of the Switch (108) adjoining the Antenna can be used. Each port on the Circulator (170) has an independent Single Pull Single Throw (SPDT) Switch, shown. Control of these switches enables exactly the same control as the System of FIG. 7. However, use of a RF Circulator (170) enables simultaneous transmit and receive from the full system, dependent on the Isolation of the Circulator ports as well as the output power of the PA (105). All boresight and Far Field Calibration actions as exactly the same as the system in FIG. 7.

REFERENCES

Incorporated Herein by Reference

Judd, M. (2018) U.S. Pat. No. 10,185,022

What is claimed is:

1. A system that compensates and corrects for unknown path delay and amplitude changes in a far field transmit radiation path from a transmitter circuit through to a radio frequency (RF) antenna, or a far field point, or an infinite line of bearing, into a RF far field, and estimating both a far field complex steering vector from the far field point to each array antenna channel in the system, and estimating a forward steering vector for the total phase delay and signal amplitude for each array antenna channel from an internal RF exciter source or a Digital to Analog Converter (DAC) to the far field point or infinite line of bearing, in real time comprising:

for each RF channel, a multiplicity of circuit paths from the RF exciter, or an RF transceiver system, to the antenna and back towards a receiver circuit path, a multiplicity of independent input RF sources including the internal RF exciter source as well as an external RF source, which is split into the multiplicity of circuit paths, one for each RF channel, whereas an outer circuit path contains a coupled input path from either source, a transmission line to a 3:1 RF switch, a 3:1 RF switch an RF power amplifier, a 2:1 RF switch near the antenna, a second passive coupler to couple in the signal from an inner primary circuit path, and a path to a receiver channel that can include amplifying active devices, whereas the inner primary circuit path, has most of the elements of the outer circuit path including the first coupler and the 3:1 RF switch, however short circuits the 2:1 switch along the power amplifier and antenna path, and directly couples into the second passive coupler to provide a difference path that enables the estimation of the outer circuit path length component and the inner primary circuit path length component between the 3:1 switch and the second passive coupler, whereas a reflection circuit path utilizes a RF coupler or a summer and the transmission line to the 3:1 switch, however, the signal would be reflected at the 3:1 switch, pass back through the transmission line and summer, and short directly to a third RF coupler, and then directly to the receiver channel, and is used to aid in estimation of the transmission line length from the first RF coupler to the 3:1 RF switch, whereas the 2:1 RF switch near the antenna can switch the outer circuit path to transmit and radiate RF energy from the antenna or to route this same energy to the second RF coupler, wherein the 2:1 RF switch can be substituted for a RF Circulator, whereas the external RF source can be a simple tone signal source, or wideband source, whereas the internal RF exciter source can also be the same device that generates the desired transmission signal into the far field, whereas each antenna in the array is connected to the outer circuit path through the 2:1 switch, or via the RF Circulator, whereas together the two sources and inner circuit path or the outer circuit path enable the path lengths for each and every circuit path component of both circuits to be computed and therefore differenced to estimate and compute the total RF path length from the internal RF exciter source to a far field location, or to a Far Field Calibration Signal Source, or along the infinite line of bearing in the far field, wherein a multiplicity of RF components, including the 3:1 Switch, the RF Power Amplifier, 2:1 switch, and second RF coupler, are contained within a Forward Error Correction unit, or FEC unit, which is near to the antenna, for each channel, wherein this system can be used in either a multichannel array, comprising numerous antennas, or single channel system with only a single antenna, wherein the use of the various switches in the system, and multiplicity of switching configurations and the use of the two sources, signal power and phase, is measured at each receive channel, and is used to estimate and compute the component lengths of the far field transmit radiation path from the internal RF exciter source or DAC to the antenna and including a radiated energy path to a far field location or along an infinite line of bearing, thus enabling the construction of both the far field complex steering vector and a forward steering vector which can be used to accurately steer a transmit signal from the array of antennas to any desired infinite line of bearing or point in the far field, and;

whereas each transmitted antenna signal is coherent among all antennas in the array to a far field location or infinite line of bearing.

2. The system of claim 1 wherein the multiplicity of circuit paths provides signaling paths that are used to compute and calibrate each path length segment of a full system including path lengths, or time delays, from the internal RF exciter source, and the external RF source, out to the infinite line of bearing, as well as including circuit paths from the antennas to each receiver, and for RF cables or transmission lines from an RF Transceiver system to the Forward Error Correction (FEC) Unit.

3. The system of claim 1 in which the far field transmit radiation path length, or forward steering vector, which is a collection of complex array weights for each array antenna channel, from the DAC within the internal RF exciter source or transmitter to the far field is power combined along the infinite line of bearing, is unknown prior to FEC system calibration and boresighting, therefore while the FEC technique corrects for all phase and amplitude variations and changes in the system, it also corrects for non-equal length RF cables from the internal RF exciter source or transmitter circuit to both the antenna and a radiated far field infinite line of bearing.

4. The system of claim 1 wherein all phase and amplitude variations and changes in the system, for both the far field transmit radiation path from the internal RF exciter source or transmitter circuit into the radiated far field or infinite line of bearing, are corrected, including phase and/or amplitude differences in non-equal length RF cables, removing any requirement for phased matched cables in the array system, and assuring RF coherency and beam steering ability to a far field point or infinite line of bearing.

5. The system of claim 1 wherein a set of complex array weights is produced for each frequency, such that with knowledge of the far field complex steering vector obtained from using the far field RF source during receive calibration, that RF transmission into the radiated far field can be effectively emulated as a planar array to the infinite line of bearing in the far field with completely known antenna phase centers, from an arbitrary multiplicity of antennas in arbitrary and non-exactly known locations and orientations and with RF cables or transmission lines that are unknown in length or unmeasured in phase.

6. The system of claim 1 wherein prior to first use, an internal boresight calibration in which RF signals are injected into each and every circuit path, is performed to compute a receive path delay and amplitude perturbation steering vector, using simultaneously measured far field receive vector phase and amplitude data from an external far field RF source, and a boresight vector representing the inner circuit path and the internal RF exciter source or external RF source is measured simultaneously.

7. The system of claim 1 wherein during initial system calibration, using the far field RF source, a receive path steering vector and a bore inner source steering vector are generated at the same time, and use either snapshot-by-snapshot boresighting or covariance boresighting to generate, via phase unwrapping and phase and amplitude interpolation, a calibration table or array manifold which includes the boresighted correction phases obtained through the inner boresight measurement.

8. The system of claim 1 wherein each boresighting measurement steering vector for each and every circuit, using either the internal exciter RF source or external RF source, is computed through sampling of a representative path and integrating samples to produce an averaged forward steering vector, which is obtained through collection of channel time samples, and formation of a sampled covariance matrix, decomposition, and selection of an eigenvector associated with a dominant eigenvalue.

9. The system of claim 1 wherein the plurality of multiple RF circuit paths and the plurality of independent internal and external RF sources provides multiple different RF circuit and source paths, including the bore inner source, the bore inner exciter, a bore outer source, and a bore outer exciter, each that are measured, and produce a set of multiple distinct array steering vectors comprising multiple different circuit paths which all go through the FEC antenna unit and are denoted as the inner circuit path and outer circuit paths, which include the unknown path lengths of the RF transmission lines from the inner RF Exciter source or transmitter circuit to the radiating antennas, in reference to a particular circuit path chosen.

10. The system of claim 1 wherein use of multiple distinct circuit and source boresighting paths, the use of a far field radiating source to generate the far field complex steering vector and full receive path steering vector, and other representative steering vectors, enables a generation of a perfect replica of a desired forward, or transmit, path delay and amplitude variations from the Digital to Analog Converters (DACs) in the inner RF exciter source or transmitter circuit through the antennas in the array, and including the radiated far field antenna-to-target delay point or infinite line of bearing, therein representing a net path, or distance delays from the DACs-through the RF exciter or transmitter and up through the antennas for a complete RF system, and all RF channels, that enable coherent RF power combining in the far field either along the desired infinite line of bearing or to a single or multiplicity of points in the RF far field.

* * * * *